United States Patent
Golm et al.

(10) Patent No.: US 11,904,376 B2
(45) Date of Patent: Feb. 20, 2024

(54) ENERGY-DISSIPATING COVER AND METHODS FOR MAKING THE COVER

(71) Applicant: GM GLOBAL TECHNOLOGY OPERATIONS LLC, Detroit, MI (US)

(72) Inventors: Erik B. Golm, Warren, MI (US); Louis G. Hector, Jr., Shelby Township, MI (US); Anil K. Sachdev, Rochester Hills, MI (US); Andrew C. Bobel, Troy, MI (US); Kevin B. Rober, Washington, MI (US); Jianfeng Wang, Jiangsu (CN)

(73) Assignee: GM Global Technology Operations LLC, Detroit, MI (US)

( * ) Notice: Subject to any disclaimer, the term of this patent is extended or adjusted under 35 U.S.C. 154(b) by 854 days.

(21) Appl. No.: 16/940,452

(22) Filed: Jul. 28, 2020

(65) Prior Publication Data
US 2022/0039278 A1    Feb. 3, 2022

(51) Int. Cl.
| | | |
|---|---|---|
| *B21D 37/10* | (2006.01) | |
| *B21D 37/16* | (2006.01) | |
| *B21D 13/02* | (2006.01) | |
| *B62D 21/15* | (2006.01) | |

(52) U.S. Cl.
CPC .............. *B21D 37/10* (2013.01); *B21D 13/02* (2013.01); *B21D 37/16* (2013.01); *B62D 21/15* (2013.01); *Y10T 428/12417* (2015.01)

(58) Field of Classification Search
None
See application file for complete search history.

(56) References Cited

U.S. PATENT DOCUMENTS

| | | | | |
|---|---|---|---|---|
| 2,186,288 | A * | 1/1940 | Gallagher | .............. B21D 13/02 72/385 |
| 5,242,735 | A * | 9/1993 | Blankenburg | .......... E04C 2/326 428/116 |
| 2003/0047964 | A1 | 3/2003 | Jurica | |
| 2003/0155474 | A1 * | 8/2003 | Dean | .................... G11B 33/124 248/300 |

(Continued)

FOREIGN PATENT DOCUMENTS

| | | |
|---|---|---|
| CN | 1479680 A | 3/2004 |
| CN | 101952143 A | 1/2011 |

(Continued)

*Primary Examiner* — Seth Dumbris
(74) *Attorney, Agent, or Firm* — Quinn IP Law

(57) ABSTRACT

An energy-dissipating cover for covering a component sensitive to mechanical impulse includes a sheet of selected ferrous or aluminum alloy, the sheet having a top surface, a bottom surface, an outer perimeter, an overall area within the outer perimeter and a nominal thickness of no more than 2.5 mm. The sheet is configured for connection with one or more external structures at a plurality of connection points within the outer perimeter, wherein the overall area comprises a plurality of supported areas and at least one unsupported area. Embossments are formed within the at least one unsupported area and extend outward from the bottom surface. The embossments are shaped, sized and arranged so as to limit orthogonal deflection of the sheet from a mechanical impulse directed normal to the bottom surface of the sheet at the plurality of embossments.

20 Claims, 16 Drawing Sheets

(56) References Cited

U.S. PATENT DOCUMENTS

| | | | | |
|---|---|---|---|---|
| 2009/0013633 A1* | 1/2009 | Aubuchon | ............. | B21D 13/02 |
| | | | | 52/634 |
| 2009/0202856 A1* | 8/2009 | Hiraoka | ................ | B21B 1/227 |
| | | | | 428/604 |
| 2010/0244469 A1 | 9/2010 | Gerwolls | | |
| 2011/0111249 A1* | 5/2011 | Sunaga | ................ | B62D 35/02 |
| | | | | 428/603 |
| 2013/0288069 A1 | 10/2013 | Takahashi | | |
| 2014/0377484 A1* | 12/2014 | Oxley | ................... | B21D 5/086 |
| | | | | 72/203 |
| 2018/0281040 A1* | 10/2018 | Abe | ...................... | B21D 13/02 |

FOREIGN PATENT DOCUMENTS

| | | |
|---|---|---|
| CN | 105292267 A | 2/2016 |
| CN | 206104701 U | 4/2017 |
| CN | 106862371 A | 6/2017 |
| CN | 107470434 A | 12/2017 |
| CN | 108026972 A | 5/2018 |
| CN | 207896171 U | 9/2018 |
| CN | 110313082 A | 10/2019 |
| CN | 111108015 A | 5/2020 |
| CN | 111192985 A | 5/2020 |

\* cited by examiner

ENERGY-DISSIPATING COVER AND METHODS FOR MAKING THE COVER

INTRODUCTION

This disclosure relates generally to energy-dissipating covers for covering components sensitive to mechanical impulse, and to methods for making such energy-dissipating covers.

Electromechanical devices such as automotive vehicles, industrial machinery, measuring equipment and the like are each designed for use in particular environments. These devices are typically housed in enclosures, panels, cabinets, coverings and so forth (hereinafter "coverings") in order to protect the electromechanical devices and their internal components from exposure to or encounters with certain environmental factors such as dust, debris, rain, snow, mechanical impulses, etc.

One way of increasing the ability of such coverings to protect the devices and their internal components is to make the coverings out of thicker material, and/or to use higher strength materials for the coverings. However, such measures may undesirably add weight and/or cost. Another approach is to secure shields or barriers to selected areas of the coverings, and to make such shields or barriers out of thicker and/or higher strength material, but this may also undesirably add weight and/or cost to the overall system.

SUMMARY

According to one embodiment, an energy-dissipating cover for covering a component sensitive to mechanical impulse includes a sheet of metal having a plurality of embossments formed therein. The sheet of metal is selected from a ferrous alloy having a yield strength of at least 900 MPa, a ferrous alloy having a strain hardening index of at least 0.15 and an aluminum alloy having a yield strength of at least 200 MPa. The sheet defines in-plane and orthogonal out-of-plane directions and has a top surface, a bottom surface, an outer perimeter, an overall area within the outer perimeter and a nominal thickness of no more than 2.5 mm. The sheet is configured for connection with one or more external structures at a plurality of connection points within the outer perimeter, wherein the overall area includes a plurality of supported areas and at least one unsupported area that does not overlap any of the supported areas. Each of the supported areas runs along the outer perimeter, surrounds at least one of the plurality of connection points, surrounds one or more folds formed in the sheet, and/or surrounds one or more reinforcements attached to the sheet. The plurality of embossments is formed within the at least one unsupported area and extends outward from the bottom surface. The embossments are shaped, sized and arranged so as to be effective for limiting to no more than 12 mm an orthogonal deflection of the sheet from a mechanical impulse, wherein the mechanical impulse is directed normal to the bottom surface of the sheet at the plurality of embossments and has a kinetic energy of 85 J and a duration of no more than 10 ms.

Each of the embossments may be one of a generally hemispherical embossment, a generally pyramidal embossment, a generally delta ($\Delta$)-shaped embossment, a generally frusto-hemispherical embossment, a generally frusto-pyramidal embossment and a generally sigma ($\Sigma$)-profiled embossment. The shape, size and arrangement of the embossments may be effective for dissipating in-plane a substantial portion of the kinetic energy of the mechanical impulse. The metal may be one of a ferrous alloy having a yield strength of at least 900 MPa with the substantial portion being at least 9%, and an aluminum alloy having a yield strength of at least 300 MPa with the substantial portion being at least 12%.

Each generally pyramidal embossment may include three, four, five or six generally triangular side portions and each generally frusto-pyramidal embossment may include three, four, five or six generally isosceles trapezoid-shaped side portions. A base edge of each generally pyramidal or generally frusto-pyramidal embossment may be substantially contiguous with a second base edge of an adjacent generally pyramidal or generally frusto-pyramidal embossment, and a base edge of each generally delta ($\Delta$)-shaped embossment may be substantially contiguous with a second base edge of an adjacent generally delta ($\Delta$)-shaped embossment. The energy-dissipating cover may further include a respective generally hemispherical embossment or generally frusto-hemispherical embossment disposed at each vertex of each generally delta ($\Delta$)-shaped embossment. Each of the plurality of embossments may be generally hemisphere-shaped, generally frusto-hemisphere-shaped or generally sigma ($\Sigma$)-profiled, and the embossments may be spaced apart from each other.

The energy-dissipating cover may be one of a skid plate, a battery tray bottom sheet and a battery compartment side wall, and the component sensitive to mechanical impulse may be one of a battery, an engine component, a transmission component and an exhaust component. In one aspect of the energy-dissipating cover, the metal may be a ferrous alloy having a yield strength of at least 900 MPa, the nominal thickness may be 1.0 to 1.5 mm, and each of the plurality of embossments may be generally pyramid-shaped or generally frusto-pyramid-shaped. In another aspect of the energy-dissipating cover, the metal may be a ferrous alloy having a yield strength of at least 250 MPa and a strain hardening index of 0.15 to 0.80, the nominal thickness may be 1.5 to 2.5 mm, and each of the plurality of embossments may be generally hemisphere-shaped or generally frusto-hemisphere-shaped. In yet another aspect of the energy-dissipating cover, the metal may be an aluminum alloy having a yield strength of at least 200 MPa, the nominal thickness may be 1.5 to 2.5 mm, and each of the plurality of embossments may be generally pyramid-shaped, generally sigma ($\Sigma$)-profiled or generally delta ($\Delta$)-shaped.

In another embodiment, an energy dissipation system includes a component sensitive to mechanical impulse and an energy-dissipating cover disposed so as to cover the component. The component includes one of a battery, an engine component, a transmission component and an exhaust component. The energy-dissipating cover includes: (i) a sheet of metal selected from a ferrous alloy having a yield strength of at least 900 MPa, a ferrous alloy having a strain hardening index of at least 0.15 and an aluminum alloy having a yield strength of at least 200 MPa, the sheet defining in-plane and orthogonal out-of-plane directions and having a top surface facing the component, a bottom surface, an outer perimeter, an overall area within the outer perimeter and a nominal thickness of no more than 2.5 mm, wherein the sheet is configured for connection with one or more external structures at a plurality of connection points within the outer perimeter, wherein the overall area includes a plurality of supported areas and at least one unsupported area that does not overlap any of the supported areas, wherein each of the supported areas runs along the outer perimeter, surrounds at least one of the plurality of connection points, surrounds one or more folds formed in the sheet, and/or surrounds one or more reinforcements attached to the sheet; and (ii) a plurality of embossments formed within the at least one unsupported area and extending outward from the bottom surface, wherein the embossments are shaped, sized and arranged so as to be effective for dissipating in-plane a substantial portion of a kinetic energy of a mechanical impulse of 85 J having a duration of no more than 10 ms directed normal to the bottom surface of the sheet at the plurality of embossments and for limiting orthogonal deflection of the sheet from the mechanical impulse to no more than 12 mm, wherein each of the plurality of embossments is generally hemisphere-shaped, generally pyramid-shaped, generally delta (Δ)-shaped, generally frusto-hemisphere-shaped, generally frusto-pyramid-shaped or generally sigma (Σ)-profiled.

The metal may be one of a ferrous alloy having a yield strength of at least 900 MPa with the substantial portion being at least 9%, and an aluminum alloy having a yield strength of at least 300 MPa with the substantial portion being at least 12%. In one aspect of the energy dissipation system, each generally hemisphere-shaped, generally frusto-hemisphere-shaped or generally sigma (Σ)-profiled embossment may be spaced apart from each other embossment, each generally pyramid-shaped embossment may include three, four, five or six triangular side portions and each generally frusto-pyramid-shaped embossment may include three, four, five or six isosceles trapezoid-shaped side portions, wherein a base edge of each generally pyramid-shaped, generally frusto-pyramid-shaped or generally delta (Δ)-shaped embossment is substantially contiguous with a second base edge of an adjacent generally pyramid-shaped, generally frusto-pyramid-shaped or generally delta (Δ)-shaped embossment. In another aspect, the energy dissipation system may further include a respective generally hemispherical embossment or generally frusto-hemispherical embossment disposed at each vertex of each generally delta (Δ)-shaped embossment. In yet another aspect of the energy dissipation system, the metal may be a ferrous alloy having a yield strength of at least 900 MPa, the nominal thickness may be 1.0 to 1.5 mm, and each of the plurality of embossments may be generally pyramid-shaped or generally frusto-pyramid-shaped. In still another aspect of the energy dissipation system, the metal may be a ferrous alloy having a yield strength of at least 250 MPa and a strain hardening index of 0.15 to 0.80, the nominal thickness may be 1.5 to 2.5 mm, and each of the plurality of embossments may be generally hemisphere-shaped or generally frusto-hemisphere-shaped. And in yet another aspect of the energy dissipation system, the metal may be an aluminum alloy having a yield strength of at least 200 MPa, the nominal thickness may be 1.5 to 2.5 mm, and each of the plurality of embossments may be generally pyramid-shaped, generally sigma (Σ)-profiled or generally delta (Δ)-shaped.

In yet another embodiment, a method of forming embossments in a sheet of metal includes: (i) placing the sheet on a first surface of a female die, the first surface having a plurality of embossment cavities arranged thereon; (ii) inductively heating the sheet at one or more loci on the sheet which correspond to respective locations of a selection of the plurality of embossment cavities; (iii) positioning a male die over the sheet and the female die, wherein the male die has one or more embossment protrusions which correspond in size, shape and arrangement to the selection of embossment cavities, such that the one or more embossment protrusions are disposed in registration with the selection of the plurality of embossment cavities; and (iv) pressing the sheet at the one or more loci with the one or more embossment protrusions so as to form the embossments in the sheet. The metal may be one of a ferrous alloy having a yield strength of at least 900 MPa, a ferrous alloy having a strain hardening index of at least 0.15 and an aluminum alloy having a yield strength of at least 200 MPa. The embossment cavities and protrusions may be configured to produce embossments in the sheet that are generally hemispherical, generally pyramidal, generally delta (Δ)-shaped, generally frusto-hemispherical, generally frusto-pyramidal or generally sigma (Σ)-profiled. The selection of embossment cavities may be less than an entirety of the plurality of embossment cavities. The inductively heating step may be performed by placing a coil proximate the one or more loci and passing electric current through the coil.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

Note that some of the drawings herein are presented in multiple related views, with the related views sharing a common Arabic numeral portion of the figure number and each individual view having its own unique "alphabetic" portion of the figure number. For example, FIGS. 1A, 1B and 1C are schematic bottom, side and front views, respectively, of a skid plate according to an embodiment of the disclosure; these related views share the same Arabic numeral (i.e., 1), but each individual view has its own unique "alphabetic" designation (i.e., A, B or C). When drawings are numbered in this way, reference may be made herein to the Arabic number alone to refer collectively to all the associated "alphabetics"; thus, "FIG. 1" refers to FIGS. 1A, 1B and 1C collectively. Likewise, "FIG. 2" refers to FIGS. 2A, 2B and 2C collectively, and so forth.

DETAILED DESCRIPTION

Figure 1A:
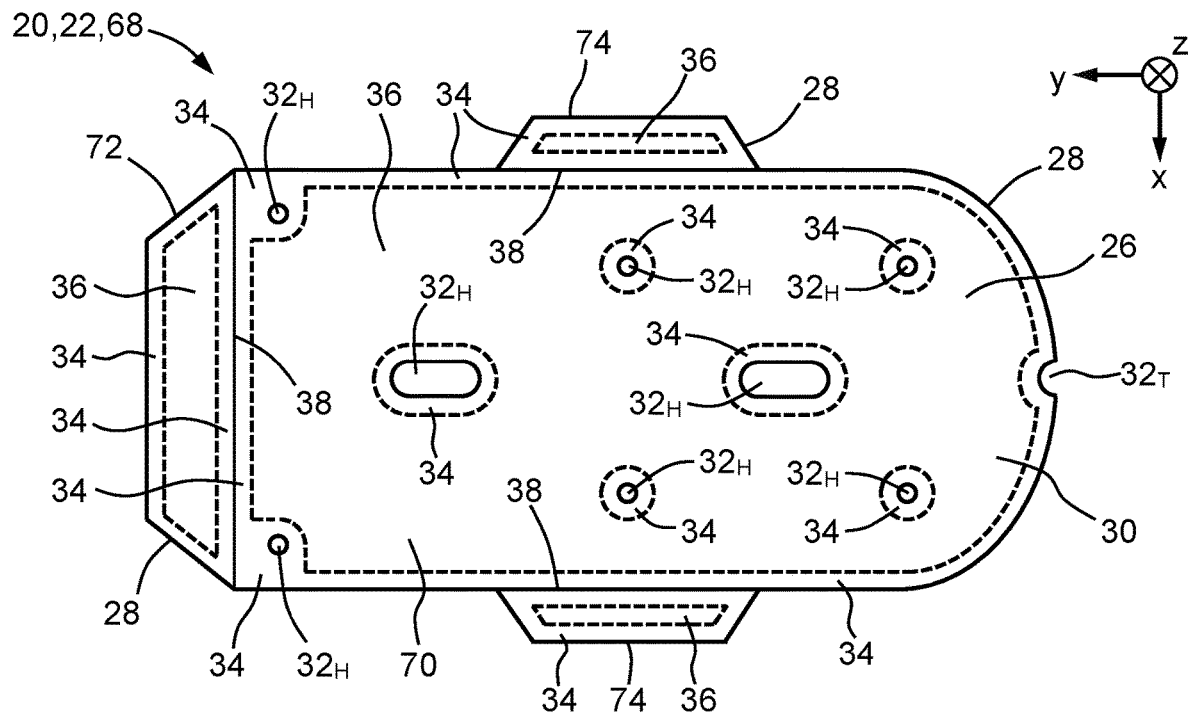
FIGS. 1A-IC are schematic bottom, side and front views, respectively, of a skid plate in accordance with the disclosure.

Referring now to the drawings, wherein like numerals indicate like parts in the several views, an energy-dissipating cover 20 for covering a component 11 sensitive to mechanical impact 13, an energy dissipation system 10, methods 100, 200 of forming embossments 42 in a sheet 22 of metal to form the cover 20, and apparatuses 80, 300 for forming embossments 42, are shown and described herein. Note that certain reference numerals in the drawings have subscripts, such as the six types of embossments $42_H$, $42_P$, $42_{FH}$, $42_{FP}$, $42_\Delta$ and $42_\Sigma$ shown in the drawings. Subscripts are used in the drawings and in the present description to refer to individual elements or types of elements (such as the aforementioned embossments), while the use of reference numerals without subscripts may refer to the collective group of such elements and/or to a singular but generic one of such elements. Thus, reference numeral $42_H$ refers to a specific type of embossment (i.e., generally hemispherical), while reference numeral 42 (without the subscript) may refer to all the embossments, all the types of embossments, or a singular but generic embossment (i.e., any embossment).

The present disclosure includes various configurations of energy-dissipating covers 20 having embossments 42 thereon. As will become apparent from the descriptions below, an energy-dissipating cover 20 according to the present disclosure is not merely a sheet of commonly used metal on which patterns of known embossment shapes are formed; rather, each configuration of cover 20 according to the present disclosure represents a carefully selected combination of metal, sheet thickness, and shape, size and arrangement of embossments 42 on the sheet, in order to minimize the through-plane deflection of the sheet when a particular mechanical impulse is imparted onto the bottom surface of the sheet, while keeping the sheet thickness as small as possible and still achieving the desired minimization of deflection. These combinations of metal, sheet thickness and embossments 42 provide covers 20 that are able to absorb and dissipate in-plane a substantial amount of the mechanical impulse's kinetic energy, so that the through-plane deflection of the sheet is minimized, while also minimizing the thickness (and therefore cost) of the sheet. Such energy-dissipating covers 20 may be used, for example, as under-vehicle shields or skid plates 68 to protect components 11 that are sensitive to mechanical impulse—such as electric batteries, engine components, transmission components, exhaust components and the like—from mechanical impulses 13, such as items striking the cover 20 when the vehicle runs over the items at highway speeds. (These items may include rocks, road debris, hauled items that have fallen off of other vehicles, trailer hitches that have broken loose from other vehicles, etc., including items that are moving at high speeds.) Similarly, the energy-dissipating covers 20 may also be used as floors/bottom sheets and side walls—such as in packaging enclosures or compartments—to protect batteries, fuel cells and the like. For example, the cover 20 may be used as a battery tray floor/bottom sheet 76, a battery compartment side wall 78 or the like. (As used herein, a "battery" may include a battery cell, a battery module and/or a battery pack, as well as any collection or packaging of any of the foregoing.)

Figure 1B:
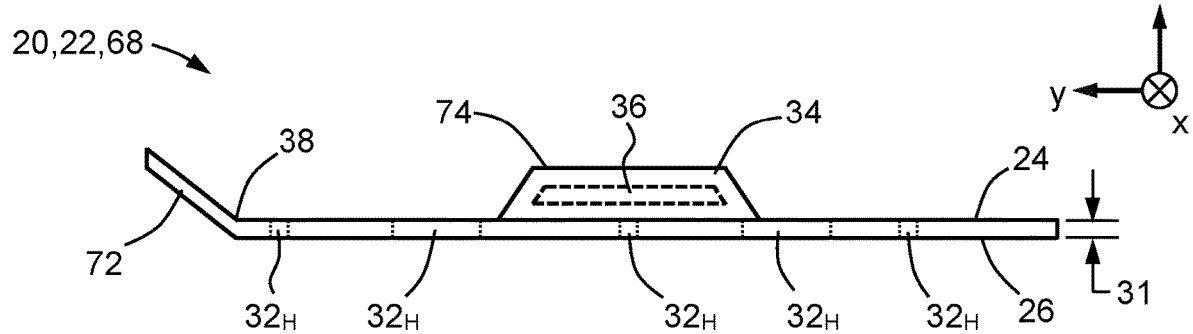
Figure 1C:
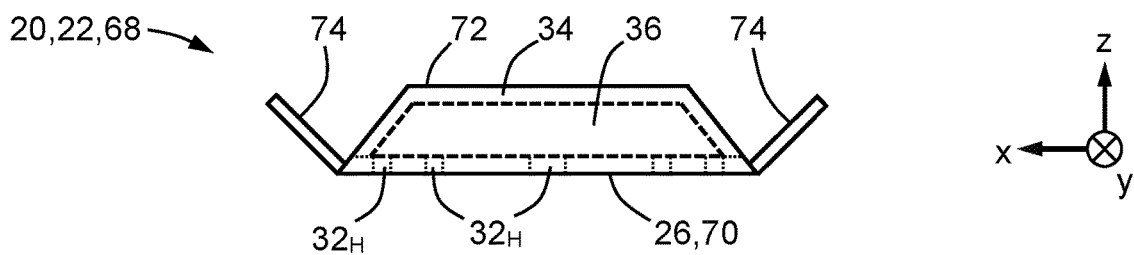
Figure 2A:
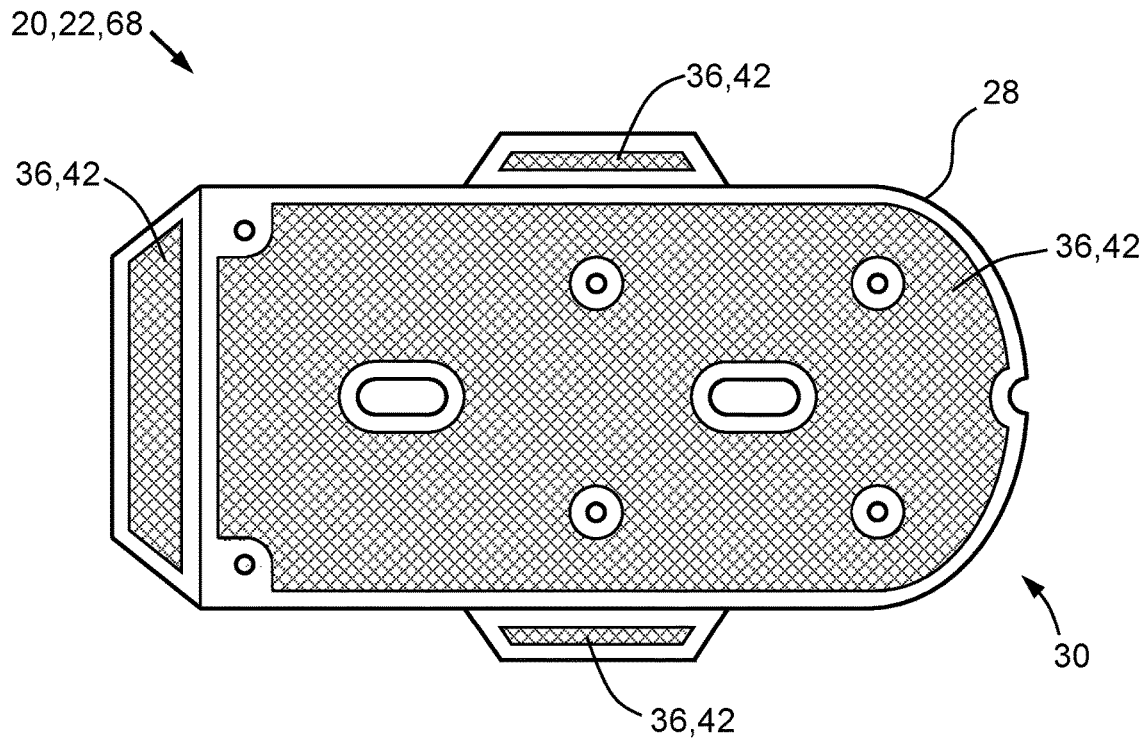
FIGS. 2A-B are alternative schematic bottom and side views, respectively, of the skid plate shown in FIG. 1.
Figure 2B:
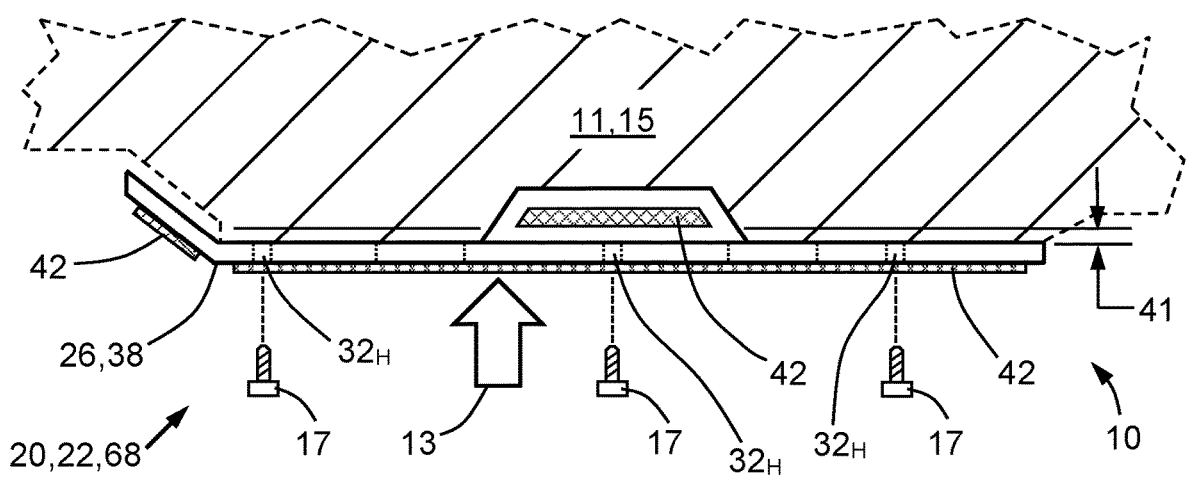

FIGS. 1A-C show schematic bottom, side and front views, respectively, of an exemplary energy-dissipating cover 20 configured as a skid plate 68, and FIGS. 2A-B show alternative schematic bottom and side views, respectively, of the skid plate 68 shown in FIG. 1. Such a skid plate 68 may be affixed to the underside of an automotive vehicle in order to protect components that would otherwise be exposed on the vehicle's underside. (Note the x, y and z axes shown in FIGS. 1A-C, which correspond to vehicle directions in which the x axis extends in the positive (+x) direction laterally left-to-right, the y axis extends in the positive (+y) direction longitudinally rearward-to-forward and the z axis extends upward and downward with the positive (+z) direction being upward. The negative directions (i.e., −x, −y, −z) are opposite to their respective positive directions.)

Figure 3A:
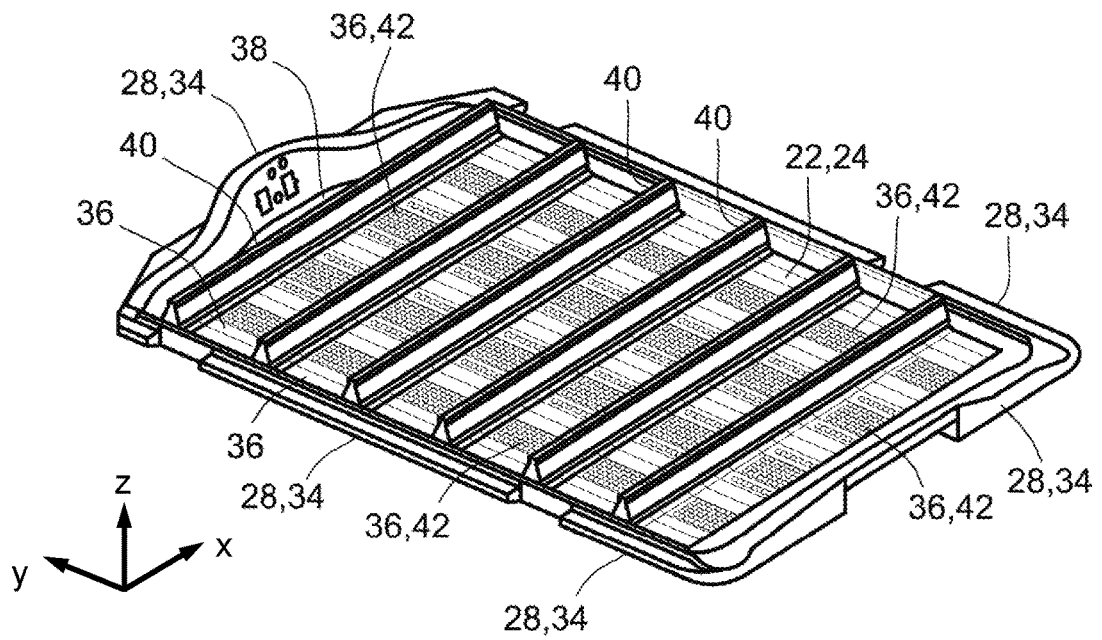
FIGS. 3A-C are perspective, schematic top and schematic side sectional views, respectively, of a battery tray bottom sheet in accordance with the disclosure.
Figure 3B:
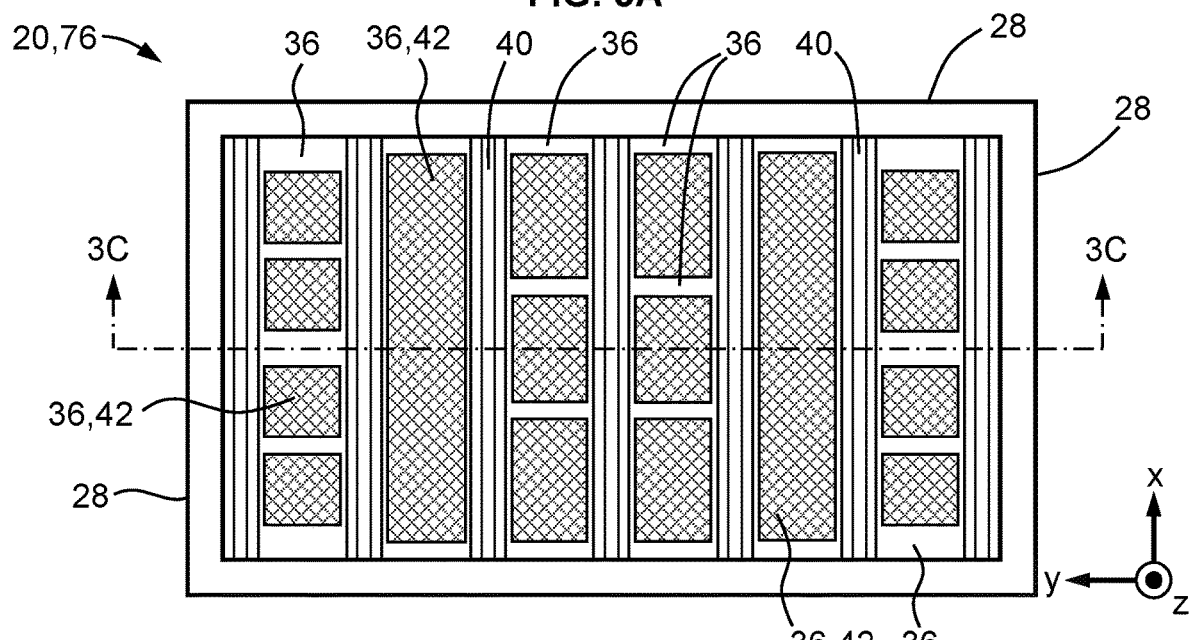
Figure 3C:
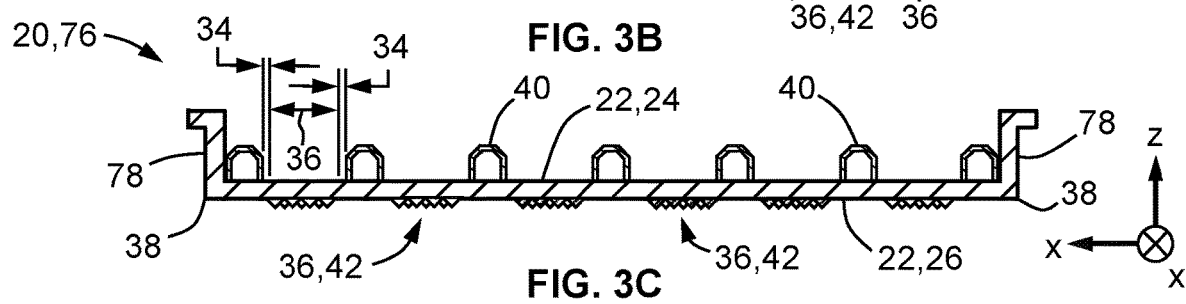

FIGS. 3A-C show perspective, schematic top and schematic sectional views, respectively, of an exemplary energy-dissipating cover 20 configured as a battery tray 76 for supporting a battery. This type of battery tray 76 may be used as the floor of a battery compartment for housing a battery or a collection of battery cells. This battery tray 76 may be disposed on the underside of a vehicle, such as underneath the passenger cabin area. The battery tray 76 may include transverse reinforcements or rails 40 extending laterally in the x (left-right) direction, as well as optional longitudinal reinforcements or rails (not shown) extending in the y (forward-rearward) direction. These rails 40 or reinforcements may be separate members which are welded, riveted, adhered or otherwise affixed to the sheet 22, or they may be formed as gross corrugations in the sheet 22 itself. The rails 40, the outer perimeter/outer edges 28 and the folds 38 in the sheet 22, as well as the portions of the sheet 22 immediately surrounding or bordering each rail 40, outer perimeter/outer edge 28 and fold 38, define multiple supported areas 34 of the sheet 22, with the remainder of the sheet 22 defining multiple unsupported areas 36. The aforementioned folds 38 may include steps, stepped portions, corrugations, creases, ridges and other types of foldings formed in the sheet 22, each of which may be relatively small or large (in terms of span and/or radius), as well as relatively smooth or abrupt in terms of transition effect. (Note that the folds 38 and embossments 42 are separate features from each other.)

Figure 4:
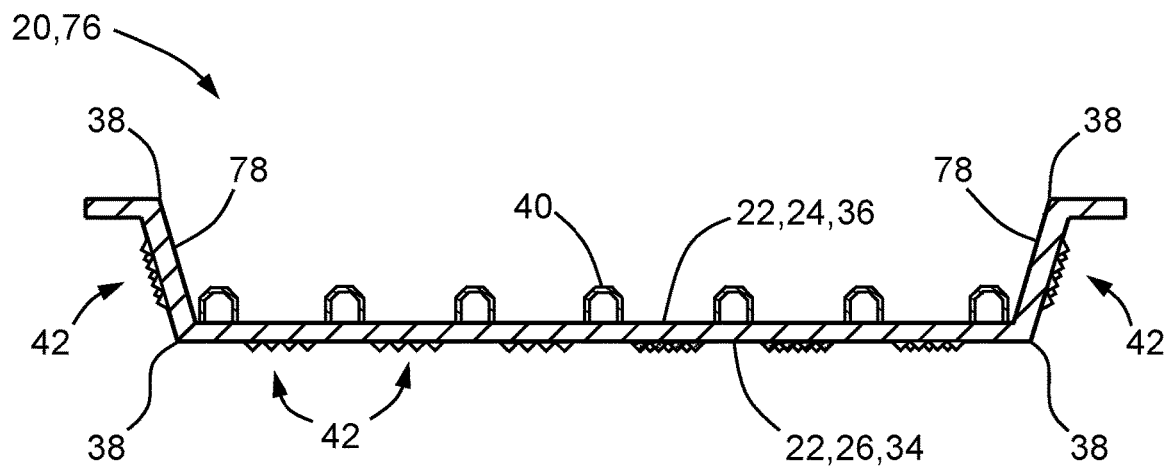
FIG. 4 is a schematic side sectional view of an alternative configuration of the battery tray bottom sheet of FIG. 3C, including embossments on the side walls.

FIG. 4 shows a schematic side sectional view of an alternative configuration of the battery tray bottom sheet 76 of FIG. 3C. In this alternative configuration, the battery compartment side walls 78 are larger than the side walls 78 shown in FIG. 3C and are sloped outward. This configuration of the side walls 78 presents some additional unsupported area 36 in which embossments 42 may be included thereon.

In the skid plate 68 of FIGS. 1-2, the battery tray 76 of FIG. 3 and the battery compartment side walls 78 of FIG. 4, as well as in other configurations of the cover 20 described herein, embossments 42 are formed in one or more of these unsupported areas 36. The embossments 42 protrude outward from the bottom surface 26 (i.e., toward the road surface with the cover 20 installed on the underside of a vehicle), and act to absorb and dissipate mechanical impulse 13 directed at the bottom surface 26 of the cover 20.

The energy-dissipating cover 20 for covering a component 11 sensitive to mechanical impulse 13 includes a sheet 22 of metal having a plurality of embossments 42 formed therein. The sheet 22 of metal is selected from a ferrous alloy having a yield strength of at least 900 MPa, a ferrous alloy having a strain hardening index of at least 0.15 and an aluminum alloy having a yield strength of at least 200 MPa. The sheet 22 defines in-plane directions (±x, ±y) and orthogonal out-of-plane directions (±z) and has a top surface 24, a bottom surface 26, an outer perimeter 28, an overall area 30 within the outer perimeter 28, and a nominal thickness 31 of no more than 2.5 mm. (The nominal thickness 31 is the starting thickness of the sheet before the processing steps described below for forming the embossments 42. Since the processing steps form the embossments 42 only in some portions of the sheet 22 and not in/on its entirety, there will be some portions of the sheet 22 where no embossments 42 are formed, and these portions will maintain the starting or nominal thickness 31.)

The sheet 22 is configured for connection with one or more external structures 15 at a plurality of connection points 32 within the outer perimeter 28 of the sheet 22. These external structures 15 may be a vehicle underside (as illustrated in FIG. 2B), a vehicle side, a vehicle front, a vehicle rear, etc., and each of the connection points 32 may include a captive fastener, an engagement tab $32_T$, a hole or slot $32_H$, or the like. The external structure(s) 15 represent(s) hardware or structure to which the sheet 22 or cover 20 may be mechanically fastened, and the connection points 32 represent locations on the sheet 22 or cover 20 at which the fastening or connection between the sheet/cover 22, 20 and the external structure 15 may occur. For example, as shown in FIG. 2B, fasteners 17 may be used at the connection points/holes $32_H$ to secure the sheet/cover 22, 20 to a vehicle underside 15.

The overall area 30 of the sheet 22 includes a plurality of supported areas 34 and at least one unsupported area 36 that does not overlap any of the supported areas 34. Each of the plurality of supported areas 34 runs along the outer perimeter 28, surrounds at least one of the plurality of connection point 32, surrounds one or more folds 38 formed in the sheet 22, and/or surrounds or is adjacent to or proximate one or more reinforcements 40 attached to the sheet 22. (As used here, "surrounds" means surrounds, encircles, envelopes, hugs, borders, and/or closely follows the outline/periphery of) The supported areas 34 tend to be parts of the sheet 22 which are more able to withstand mechanical impulse (i.e., result in less out-of-plane or through-plane deflection 41) than is the case with unsupported areas 36. In some instances this is because the supported areas 34 are buttressed or supported by the aforementioned external structures 15 to which the areas 34 are attached or against which the areas 34 are disposed. In other instances, the supported areas 34 may be adjacent to or proximate one or more reinforcements 40, such as rails, beams, supports, cross-members or the like which may be attached to or interfaced with the sheet 22. Reinforcements 40 and folds 38 may also take the form of corrugations, ridges, creases, channels, grooves and the like, which may be formed into an otherwise generally flat shape or contour of the sheet 22.

The plurality of embossments 42 is formed in the sheet 22 within the at least one unsupported area 36, with the embossments 42 extending outward from the bottom surface 26. For example, with the cover 20 installed as a skid plate 68 as illustrated in FIG. 2B, the embossments 42 are formed so as to extend downward (toward a road surface, not shown) from the bottom surface 26. As contemplated by the present disclosure, the embossments 42 are shaped, sized and arranged so as to be effective for limiting to no more than 12 millimeters (mm) an orthogonal or through-plane deflection 41 of the sheet 22 from a mechanical impulse 13, where the mechanical impulse 13 is directed normal to the bottom surface 26 of the sheet 22 at the plurality of embossments 42, with the mechanical impulse 13 having a kinetic energy of 85 Joules (J) and a duration of no more than 10 milliseconds (ms). For example, if the cover 20 is used as a skid plate 68 attached on the underside of a vehicle and is disposed in a horizontal plane parallel with the road surface, then it is desired that an upward mechanical impulse 13 of 85 J would cause an upward deflection of the sheet of no more than 12 mm. This type of mechanical impulse 13—having a kinetic energy of 85 J directed normal to the bottom surface 26 of the sheet 22—may be used to represent an item of road debris, for example, as represented by a 0.9 kilogram (kg), 60 mm diameter steel sphere traveling at 30 miles per hour (mph), striking the cover 20 at normal incidence. By use of the selected metals, a sheet thickness of no more than 2.5 mm, and particular shapes, sizes and arrangements of embossments 42 (as described below) in the unsupported areas 36 of the sheet 22, the orthogonal deflection 41 of the sheet 22 caused by the mechanical impulse 13 can be limited to no more than 12 mm. Thus, designers may use these criteria to design a cover 20 effective for protecting impulse-sensitive components 11 from the mechanical impulse 13 described above. As used herein, the mechanical impulse 13 is described as being 85 J, normally incident to the bottom surface 26 of the sheet 22, impinging upon the embossments 42 (and thus upon an unsupported area 36 of the sheet 22), and having a duration of no more than 10 ms. This describes what may be seen as a "reference" or "idealized" mechanical impulse 13 for purposes of describing the behavior and response of the cover 20 and its orthogonal deflection 41 at the site where the impulse 13 impinges upon the sheet 22. This reference or idealized case may be seen as a sort of "worst case scenario" for purposes of describing the impulse 13 and the cover's deflection response, in that impulses 13 that are less severe than this reference or idealized case would deflect even less. That is, if the cover 20 is configured to orthogonally deflect no more than 12 mm in response to the reference or idealized mechanical impulse 13, then any other impulse will deflect even less than the reference or idealized case if. (i) its kinetic energy is less than 85 J, and/or (ii) its angle of incidence with the embossments 42 on the bottom surface 26 is oblique (i.e., less than 90 degrees with respect to the bottom surface 26).

The embossments 42 may take one or more of several forms or shapes. For example, each embossment 42 may be a generally hemispherical embossment $42_H$ (FIGS. 6A-B), a generally pyramidal embossment $42_P$ (FIGS. 7A-B), a generally frusto-hemispherical embossment $42_{FH}$ (FIGS. 8A-B), a generally frusto-pyramidal embossment $42_{FP}$ (FIGS. 9A-B), a generally delta (Δ)-shaped embossment $42_\Delta$ (FIGS. 10A-B), or a generally sigma ($\Sigma$)-profiled embossment $42_\Sigma$ (FIGS. 11A-B). Note the distinction between "shaped" and "profiled" as used herein. The word "shaped" is used to describe the apparent shape of an embossment 42 as viewed in plan view, while the word "profiled" is used to describe the apparent shape of an embossment 42 as viewed in cross-section. Thus, "generally delta ($\Delta$)-shaped" describes an embossment $42_\Delta$ which appears to have a shape generally like the capital Greek letter delta ($\Delta$) as viewed in plan view, and "generally sigma ($\Sigma$)-profiled" describes an embossment $42_E$ which appears to have a shape generally like the capital Greek letter sigma ($\Sigma$) as viewed in cross-section view.

The shape, size and arrangement of the embossments 42 may be selected so as to be effective for dissipating in-plane a substantial portion of the kinetic energy of the mechanical impulse 13. For example, if the cover 20 is affixed to the underside of a vehicle and is disposed in a generally horizontal x-y plane as illustrated in FIG. 2B, then the sheet 26 and the generally horizontal x-y plane would define in-plane ±x and ±y directions, as well as upward and downward ±z through-plane directions that are orthogonal to the ±x and ±y directions and normal to the generally horizontal x-y plane. Thus, with judicious selection of the shape, size and arrangement of the embossments 42 for a given combination of metals and sheet thickness as previously described, a substantial portion of the mechanical impulse's kinetic energy may be absorbed and converted into elastic and/or plastic strain or deformation in the in-plane (±x, ±y) directions, so as to minimize the orthogonal deflection 41 in the out-of-plane (+z) direction. Specifically, for a nominal sheet thickness 31 of no more than 2.5 mm, the covers 20 according to the present disclosure are effective to limit the orthogonal deflection 41 of the sheet 22 to no more than 12 mm.

Figures 5A, 5B, 5C:
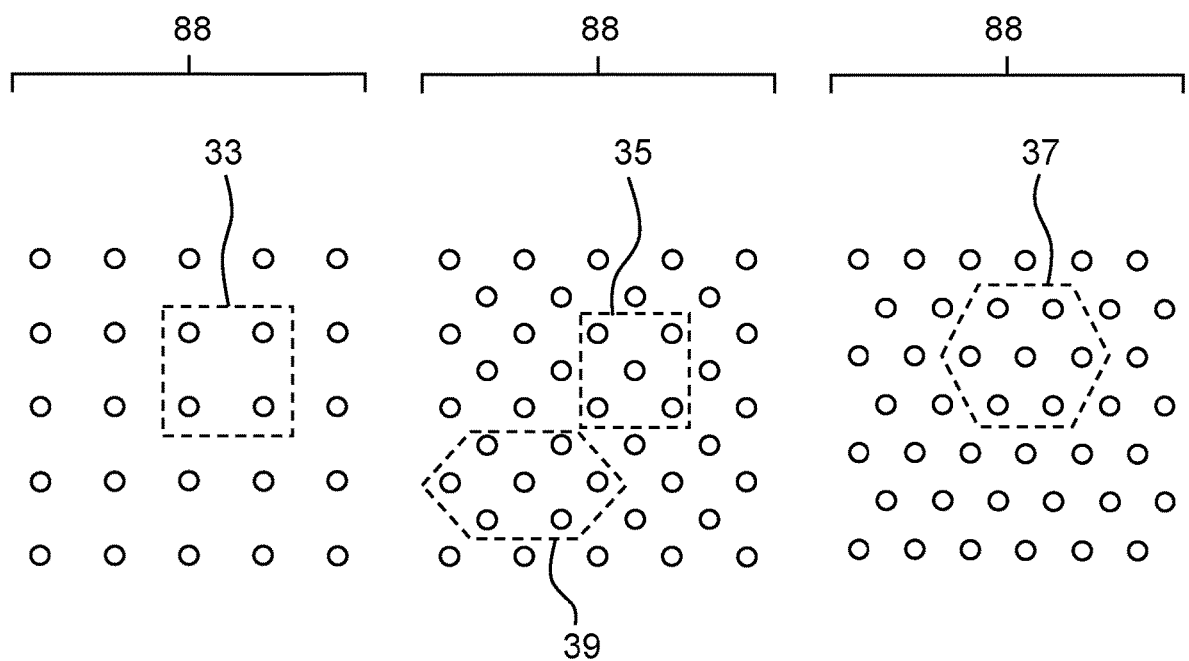
FIGS. 5A-C show rectangular, interlaced and hexagonal patterns, respectively, of embossment loci.

Note that as used herein, an "arrangement" of embossments 42 includes where individual embossments 42 are located on the sheet 22, how the embossments 42 are spaced apart from one another or are contiguated with each other, and in what pattern they are arrayed. For example, embossments 42 may be arrayed in patterns that are ordered or randomized. FIGS. 5A-C show various ordered patterns in which the embossments 42 may be arrayed. (In order to generalize the application of FIGS. 5A-C to any type or shape of embossments 42, these figures only show the loci 88 of where the embossments 42 may be formed, but do not show any particular types or shapes of embossments 42. As used herein, the singular word "locus" and its plural form "loci" 88 refer to the locations or points on the sheet 22 where individual embossments 42 are formed/located or are to be formed/located. Thus, the present disclosure distinguishes between the "loci" 88 of embossments 42 on a sheet 22, versus the "locations" 89 of embossment cavities 86 on a female die 84, as described further below in connection with TABLE 1.) Ordered patterns include "rectangular" arrays in which the loci 88 are arranged in regularly repeating non-interlaced rows and columns, such as on a rectangular grid as illustrated in FIG. 5A where the loci 88 are arranged in rectangular groupings 33 as indicated by the four loci 88 within the dashed lines. Ordered patterns also include "interlaced" arrays in which the loci 88 are arranged in regularly repeating interlaced or staggered rows and columns, such as the grid illustrated in FIG. 5B where the loci 88 are arranged in groupings 35 as indicated by the five loci 88 within the dashed lines. Ordered patterns also include "hexagonal" arrays in which the loci 88 are arranged like the grid illustrated in FIG. 5C, where the loci 88 are arranged in groupings 37 as indicated by the six loci 88 within the dashed lines. (Note that the interlaced pattern of FIG. 5B may also be viewed as a hexagonal pattern, as indicated by the other grouping 39 of six loci 88 within the dashed lines. However, note that while the grouping 37 of FIG. 4C forms a regular hexagon, the grouping 39 of FIG. 5B forms an irregular hexagon.) As used herein, the word "arrangement" may also include whether neighboring embossments 42 are spaced apart from each other (as in FIGS. 5 and 11) or are contiguous with each other (e.g., neighboring generally pyramidal embossments $42_P$ may share a common base edge $52_S$ as in FIGS. 7A-B), as well as whether neighboring embossments 42 are of the same type/shape or of different types/shapes.

While embossments 42 may take the form of various shapes, the six shapes described herein (along with particular arrangements, dimensions, spacings, etc.) have shown to be particularly and unexpectedly effective for the minimization of orthogonal deflection 41 when the sheet 22 is subjected to the mechanical impulse 13 described above. Also, some embossment shapes exhibit better effectiveness when the embossments 42 are spaced apart from each other non-contiguously, while other embossment shapes show better effectiveness when the embossments 42 are contiguous with each other. For example, in many configurations, embossments 42 which are generally hemisphere-shaped $42_H$, generally frusto-hemisphere-shaped $42_{FH}$ or generally sigma ($\Sigma$)-profiled $42_\Sigma$ appear to be more effective when spaced apart from each other. On the other hand, in many configurations, embossments 42 which are generally pyramid-shaped $42_P$, generally frusto-pyramid-shaped $42_{FP}$ or generally delta ($\Delta$)-shaped $42_\Delta$ appear to be more effective when formed contiguous with each other (i.e., sharing one or more base edges with neighboring/adjacent embossments 42).

Figure 6A:
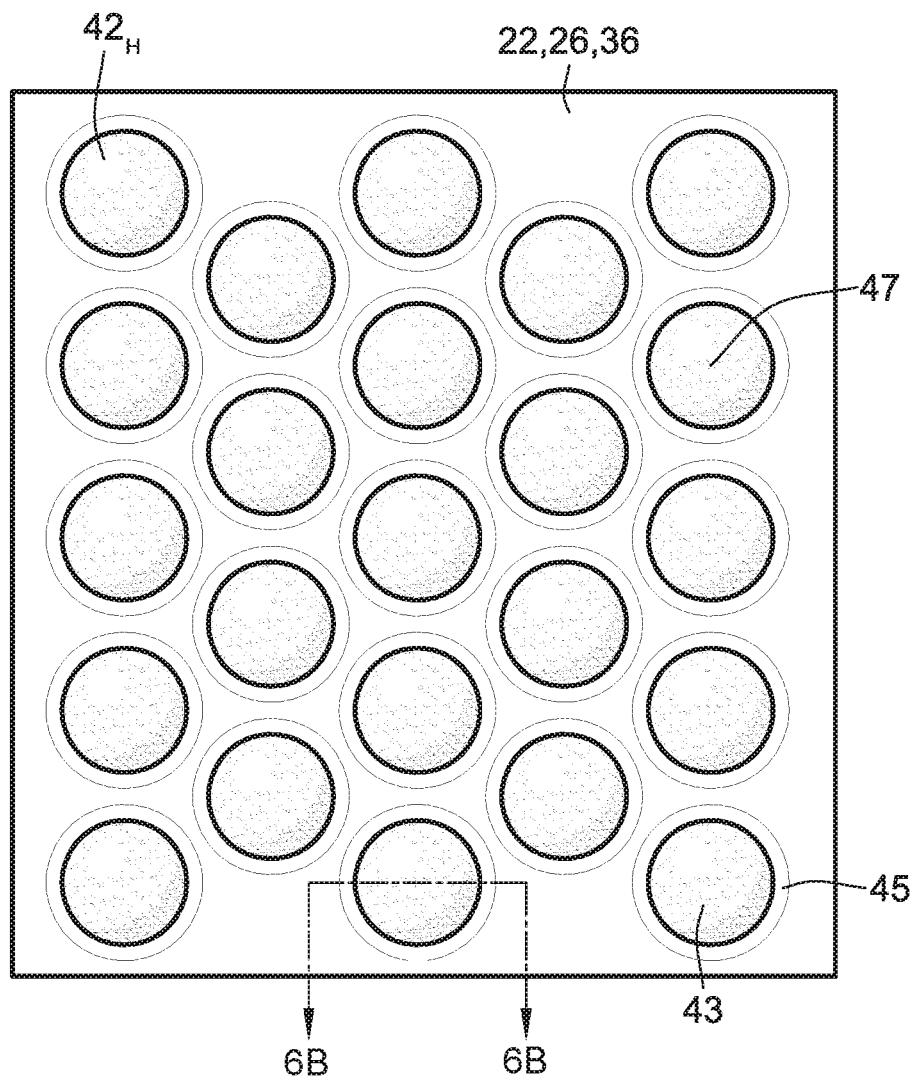
FIGS. 6A-B are bottom and sectional views, respectively, of generally hemispherical embossments.
Figure 6B:
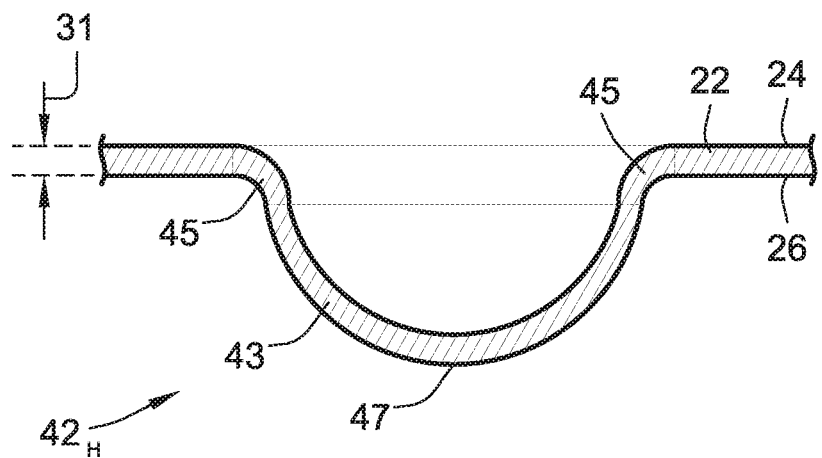
Figure 7A:
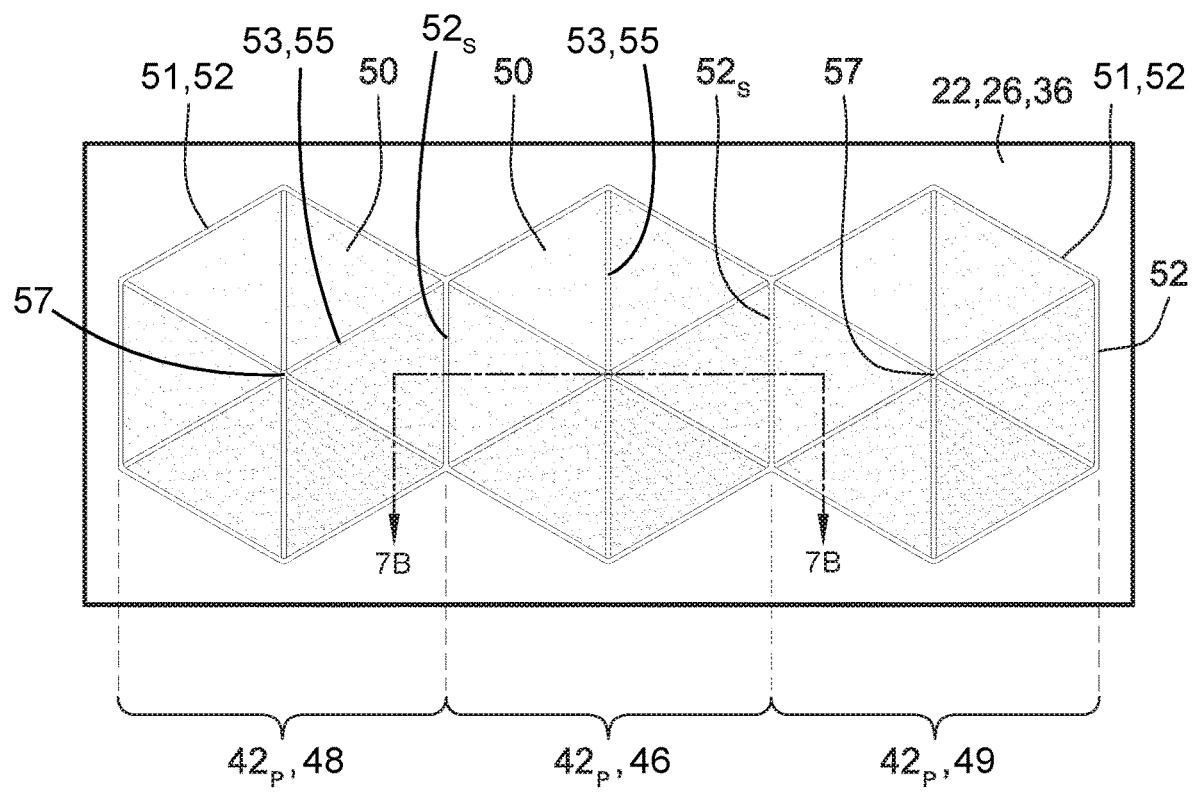
FIGS. 7A-B are bottom and sectional views, respectively, of generally pyramidal embossments.
Figure 7B:
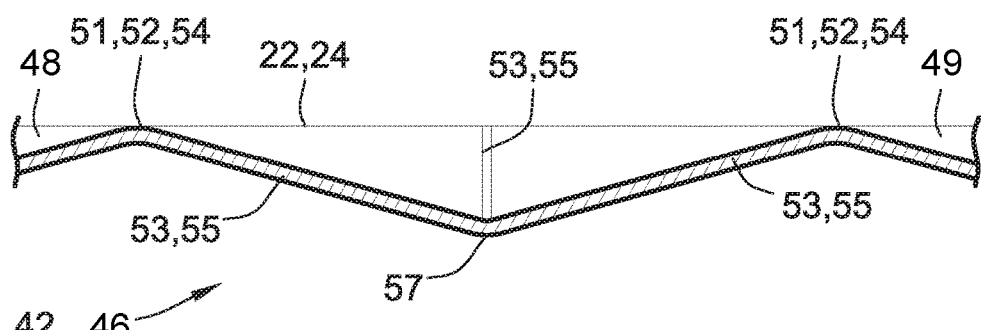
Figure 8A:
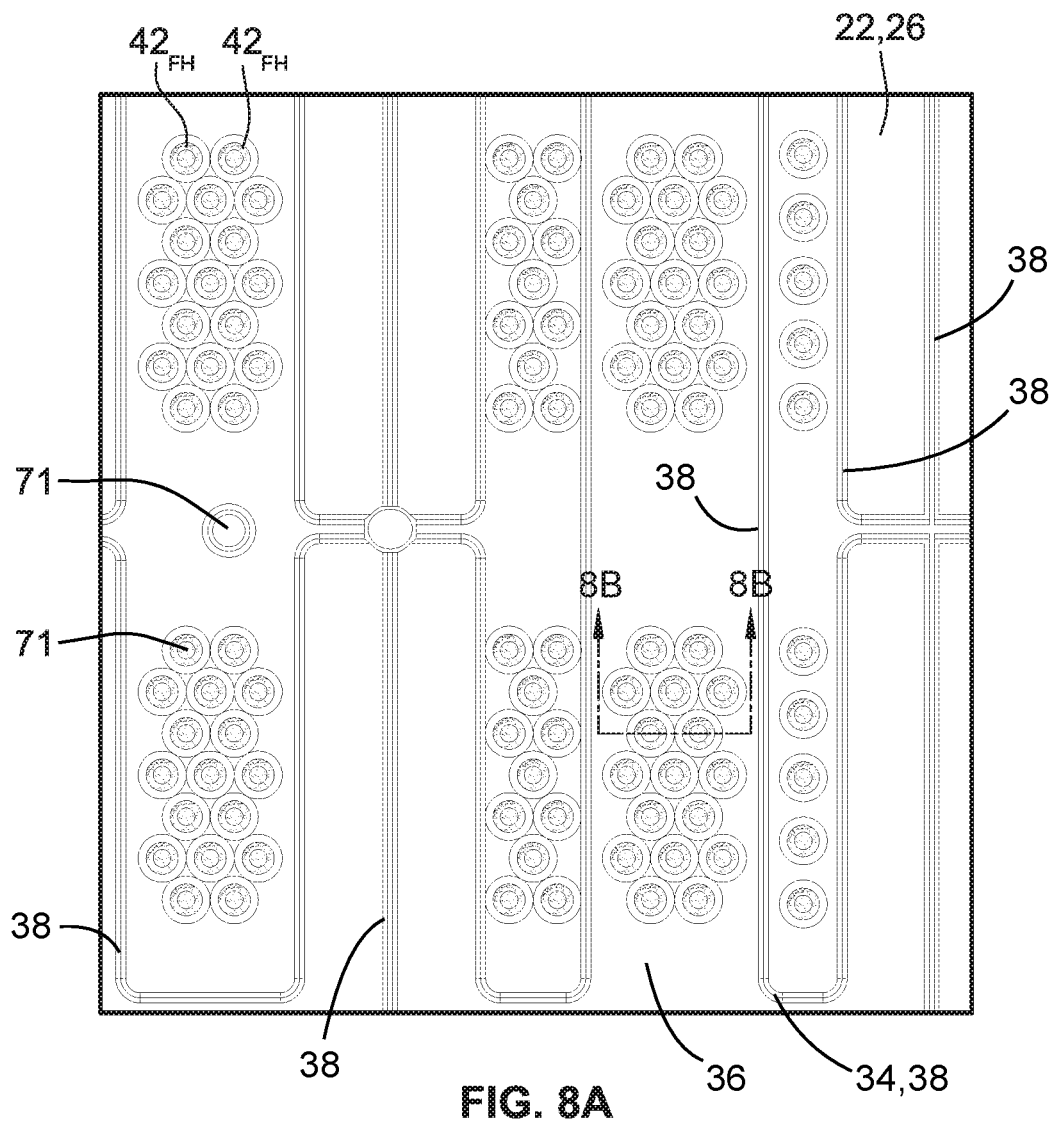
FIGS. 8A-B are bottom and sectional views, respectively, of generally frusto-hemispherical embossments.
Figure 8B:
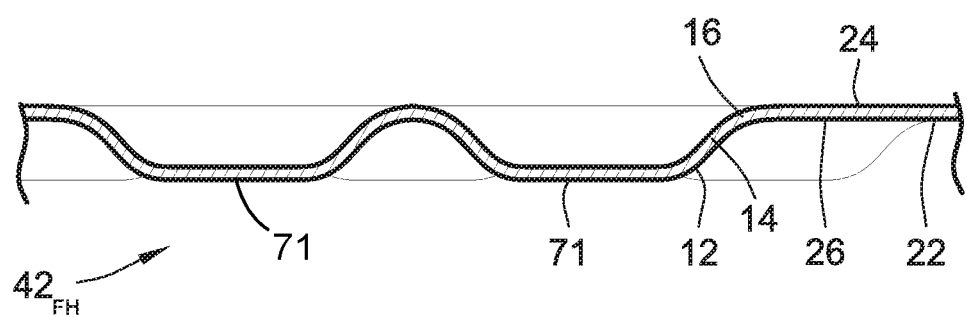

FIGS. 6A-B show bottom and sectional views, respectively, of a sheet 22 having generally hemispherical embossments $42_H$ formed thereon, while FIGS. 8A-B show bottom and sectional views, respectively, of a sheet 22 having generally frusto-hemispherical embossments $42_{FH}$ formed thereon. Both types of embossments $42_H$, $42_{FH}$ have an overall hemispherical or rounded shape, with the generally frusto-hemispherical embossments $42_{FH}$ having the general appearance of generally hemispherical embossments $42_H$ which have been flattened, truncated or "cut off", so to speak. Each generally hemispherical embossment $42_H$ has a generally hemispherical main portion 43 (shaped somewhat like a dome having a crown 47) connected with and immediately surrounded by a generally annular transition portion 45. The generally annular transition portion 45 is formed as part of the embossment manufacturing process and serves as a transition or fillet region between the generally flat profile of the unformed portions of the sheet 22 and the formed (in this case, generally hemispherical) portions of the sheet 22. Similarly, each generally frusto-hemispherical embossment $42_{FH}$ may have a generally flat circular bottom 71 connected with and immediately surrounded by a first generally annular transition portion 12, which is connected with and immediately surrounded by a generally annular wall portion 14, which is connected with and immediately surrounded by a second generally annular transition portion 16, which in turn is connected with the plane of the sheet 22 (or with the second annular transition portion(s) 16 of one or more contiguously formed frusto-hemispherical embossment(s) $42_{FH}$). The first and second generally annular transition portions 12, 16 are formed as part of the embossment manufacturing process, with the first generally annular transition portion 12 serving as a transition or fillet region between the generally flat circular bottom 71 and the annular wall portion 14, and with the second generally annular transition portion 16 serving as a transition or fillet region between the annular wall portion 14 and either the generally flat profile of the unformed portions of the sheet 22 or the second annular transition portion(s) 16 of one or more contiguously formed frusto-hemispherical embossment(s) $42_{FH}$.

As illustrated in FIGS. 7A-B and 12A-C, each generally pyramidal embossment $42_P$ may include three, four, five or six generally triangular side portions 50 which commonly meet at an apex or peak 57. Each of these generally triangular side portions 50 has a respective base edge 52 and two respective lateral edges 55. Generally pyramidal embossments $42_P$ may be arranged contiguously with each other such that neighboring pairs of such embossments $42_P$ have a shared base edge $52_S$ in common between each pair; that is, one of the base edges 52 of one generally pyramidal embossment $42_P$ in a pair of neighboring embossments $42_P$ is the same as a base edge 52 of the other generally pyramidal embossment $42_P$ in that pair. For example, note the three embossments $42_P$ shown in FIG. 7A, which are also labeled with reference numerals 46, 48 and 49. Here, the middle and left embossments 46, 48 share a common base edge $52_S$, while the middle and right embossments 46, 49 share another, different common base edge $52_S$. Thus, at least one of the base edges 52 of each generally pyramidal embossment $42_P$ may be substantially contiguous with a second base edge 52 of at least one adjacent generally pyramidal embossment $42_P$. Note that due to the manufacturing/embossment process, some of the lateral edges 55 between adjacent triangular side portions 50, and/or some of the base edges 52 between triangular side portions 50 and adjacent unformed portions of the sheet 22, may have transitions portions therebetween rather than abrupt folds. Thus, each base edge 52 may include a base edge transition portion 51, and each lateral edge 55 may include a lateral edge transition portion 53.27

As shown in FIGS. 9A-B and 12D-F, each generally frusto-pyramidal embossment $42_{FP}$ may include three, four, five or six generally isosceles trapezoid-shaped side portions 67, each of meets at and borders a generally flat bottom 69. Each of these generally isosceles trapezoid-shaped side portions 67 has a respective base edge 25, two respective lateral edges 27 and a respective bottom edge 29 which is generally parallel to the respective base edge 25. Generally frusto-pyramidal embossments $42_{FP}$ may be arranged contiguously with each other such that neighboring pairs of such embossments $42_{FP}$ have a shared base edge $25_S$ in common between each pair; that is, one of the base edges 25 of one generally frusto-pyramidal embossment $42_{FP}$ in a pair of neighboring embossments $42_{FP}$ is the same as a base edge 25 of the other generally frusto-pyramidal embossment $42_{FP}$ in that pair. For example, note the three embossments $42_{FP}$ surrounded by dashed lines in FIG. 9A. Here, the middle and top embossments $42_{FP}$ share a common base edge $25_S$, while the middle and bottom embossments $42_{FP}$ share another, different common base edge $25_S$. Thus, at least one of the base edges 25 of each generally frusto-pyramidal embossment $42_{FP}$ may be substantially contiguous with a second base edge 25 of at least one adjacent generally frusto-pyramidal embossment $42_{FP}$.

Figure 10A:
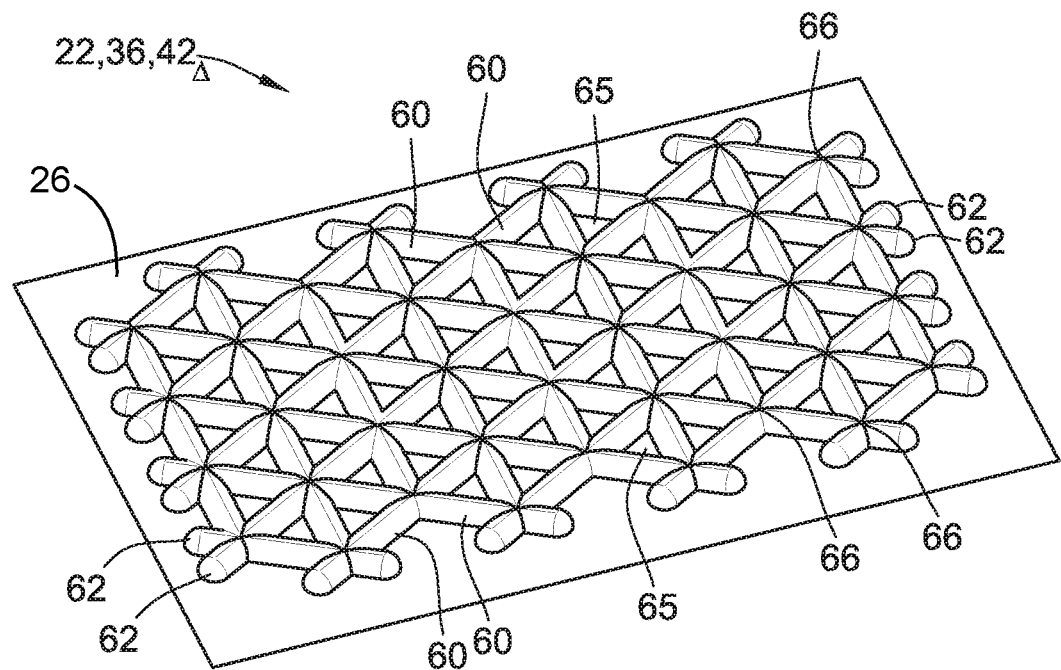
FIGS. 10A-B are bottom perspective views of first and second configurations, respectively, of generally delta (Δ)-shaped embossments.
Figure 10B:
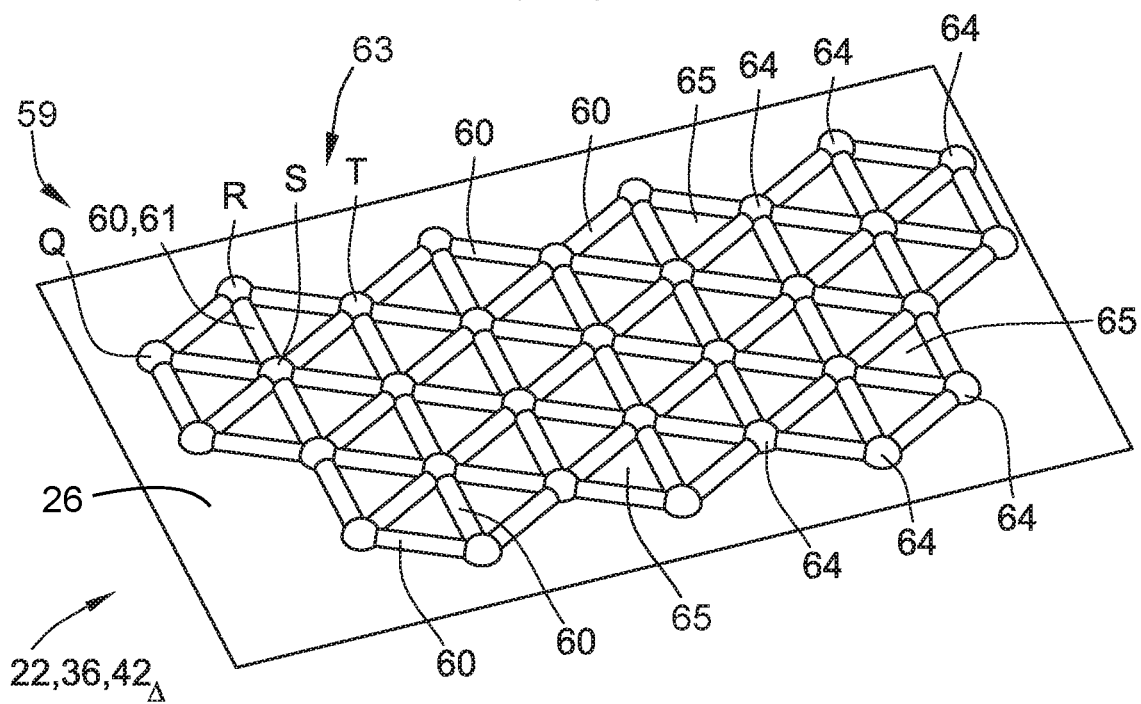
Figure 11A:
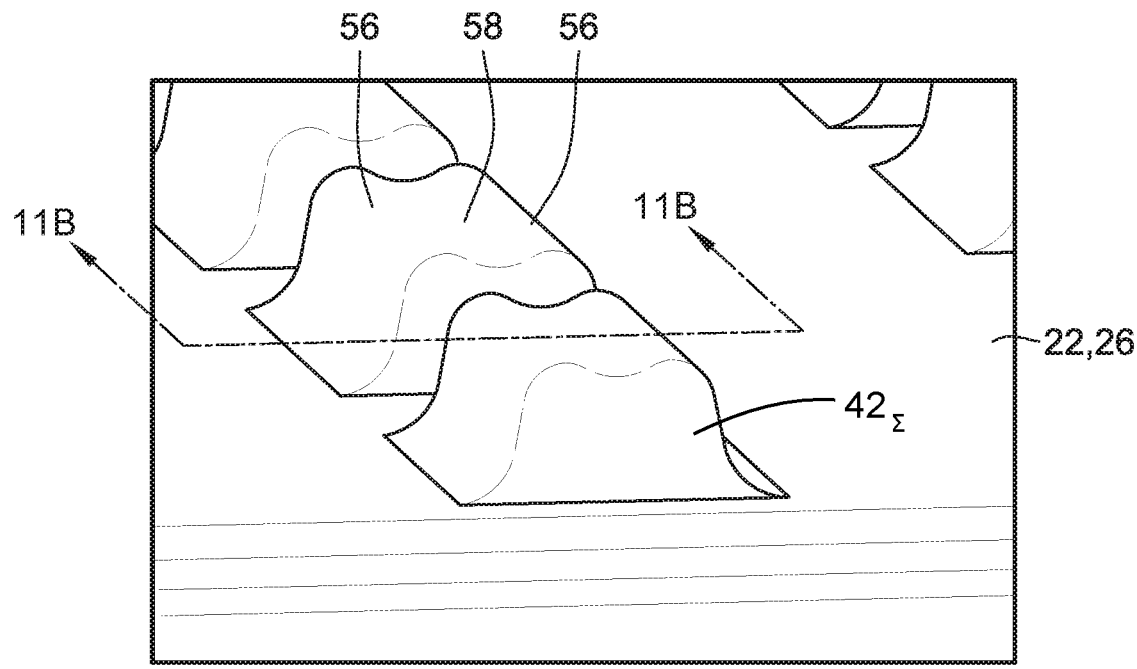
FIGS. 11A-B are bottom perspective and sectional views, respectively, of generally sigma (Σ)-profiled embossments.
Figure 11B:
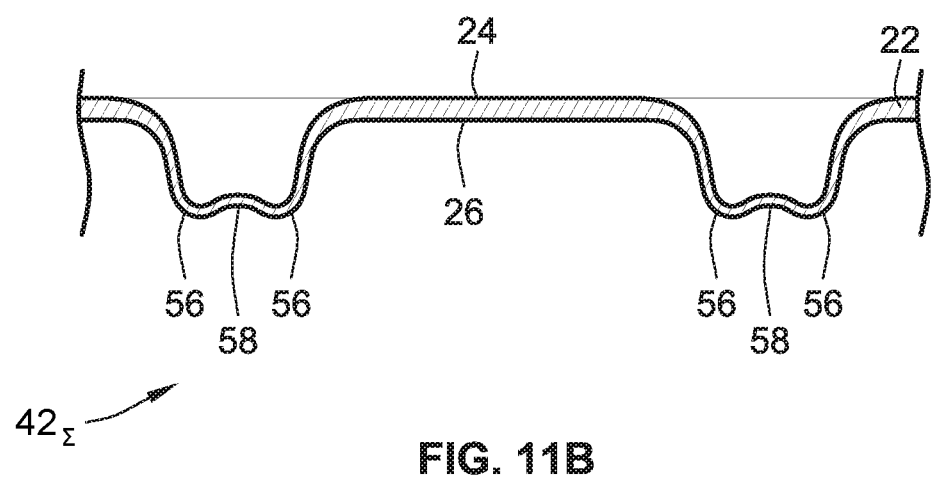
Figure 12A:
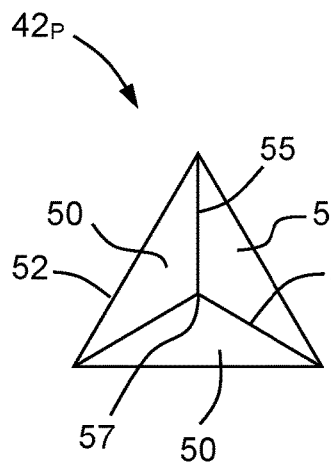
FIGS. 12A-F are schematic top views of triangular, square, pentagonal, frusto-triangular, frusto-square and frusto-pentagonal pyramidal embossments.
Figure 12B:
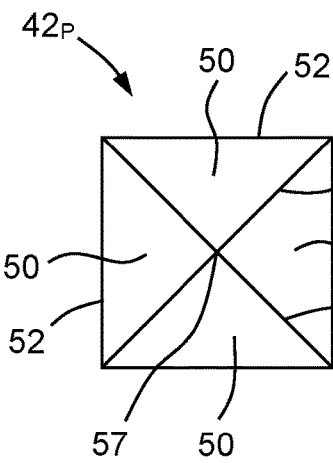
Figure 12C:
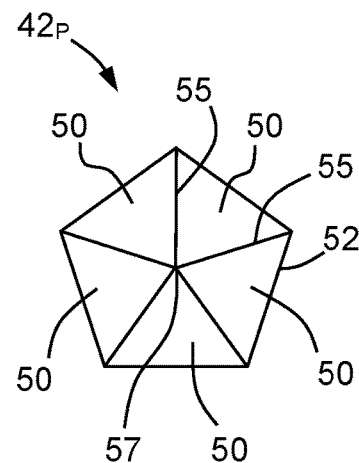
Figure 12D:
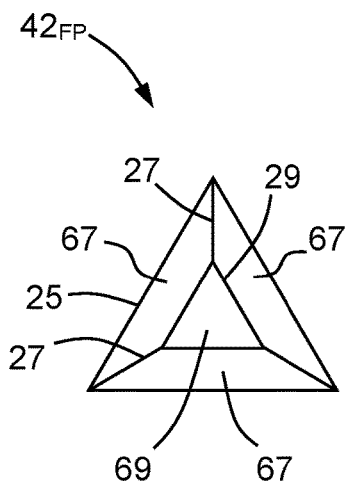
Figure 12E:
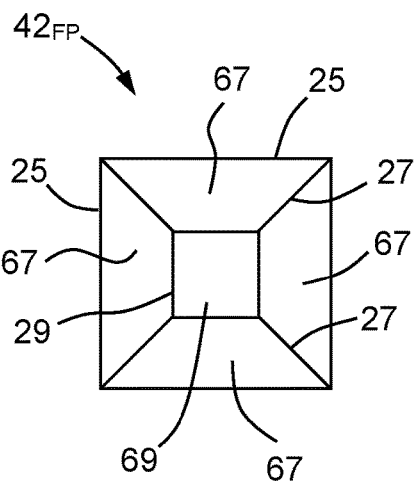
Figure 12F:
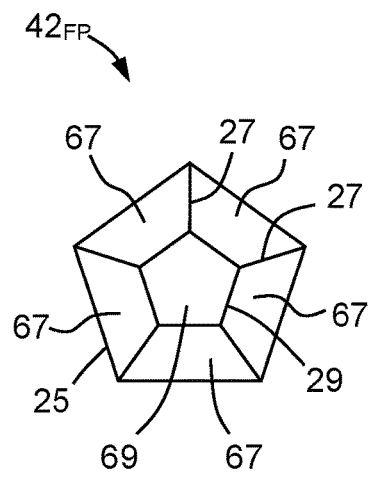

FIGS. 10A-B show perspective views of two different configurations of sheet 22 utilizing generally delta ($\Delta$)-shaped embossments $42_\Delta$. Each of these embossments $42_\Delta$ has three raised legs or base edges 60 surrounding a generally non-raised middle region 65. (As used here, "raised" means protruding outward from the plane of the bottom surface 26 of the sheet 22, and "non-raised" may mean either not protruding outward from the plane of the bottom surface 26 or not protruding outward as much as the three raised legs/base edges 60 are protruding.) The three legs 60 of each embossment $42_\Delta$ form a triangle having three vertices 66. All three legs 60 may optionally be made the same length, such that the embossment $42_\Delta$ has the shape of an equilateral triangle. The embossments $42_\Delta$ may be arranged so as to form apparent "snowflake" patterns, where each snowflake is comprised of six delta ($\Delta$)-shaped embossments $42_\Delta$ all sharing a common vertex 66. In this "snowflake" configuration, a leg/base edge 60 of each generally delta ($\Delta$)-shaped embossment $42_\Delta$ may be substantially contiguous with a second leg/base edge 61 of an adjacent generally delta ($\Delta$)-shaped embossment $42_\Delta$. For example, as illustrated in FIG. 10B, a first embossment 59 defined by vertices Q, R and S has a leg/base edge 60 between vertices R and S, and an adjacent embossment 63 defined by vertices R, S and T also has a leg/base edge 61 between vertices R and S, with these two legs/base edges 60, 61 being contiguous with (i.e., touching) each other. These two legs/base edges 60, 61 may lie side-by-side parallel with each other, or (as illustrated by FIG. 10B) they may be merged into what appears to be a single leg/base edge. (In other words, the two embossments 59, 63 may share a common leg/base edge 60, 61 defined between vertices R and S.)

One or more vertices 66 of a generally delta ($\Delta$)-shaped embossment $42_\Delta$ may include one or more nubs 62 extending outward therefrom. Similarly, each snowflake pattern may comprise six peripheral vertices 66, and one or more nubs 62 may extend outward from one or more of these vertices 66. Each nub 62 may take the form of a bump or short line segment which appears to be an extension of an adjoining raised leg/base edge 60. A generally hemispherical embossment $42_H$ or a generally frusto-hemispherical embossment $42_{FH}$ may be disposed at one or more of the vertices 66 of each generally delta ($\Delta$)-shaped embossment $42_\Delta$. The height of such embossments $42_H$, $42_{FH}$ disposed at the vertices 66 (i.e., the distance they extend outward from the plane of the bottom surface 26 of the sheet 22) may optionally be larger than the height of the raised legs/base edges 60.

FIGS. 11A-B show perspective and sectional views, respectively, of a sheet 22 having generally sigma ($\Sigma$)-profiled embossments $42_\Sigma$. As viewed in the drawings, these embossments $42_\Sigma$ may have an overall "hat-like" shape with two raised ridges 56 protruding outward from the bottom surface 26 of the sheet 22 and a less-raised middle portion 58 disposed between the two ridges 56. These embossments $42_\Sigma$ may be separated from each other and aligned in straight rows as illustrated in the drawings. Alternatively, they may not be aligned in straight rows and may be oriented along different (including randomized) directions.

Figure 9A:
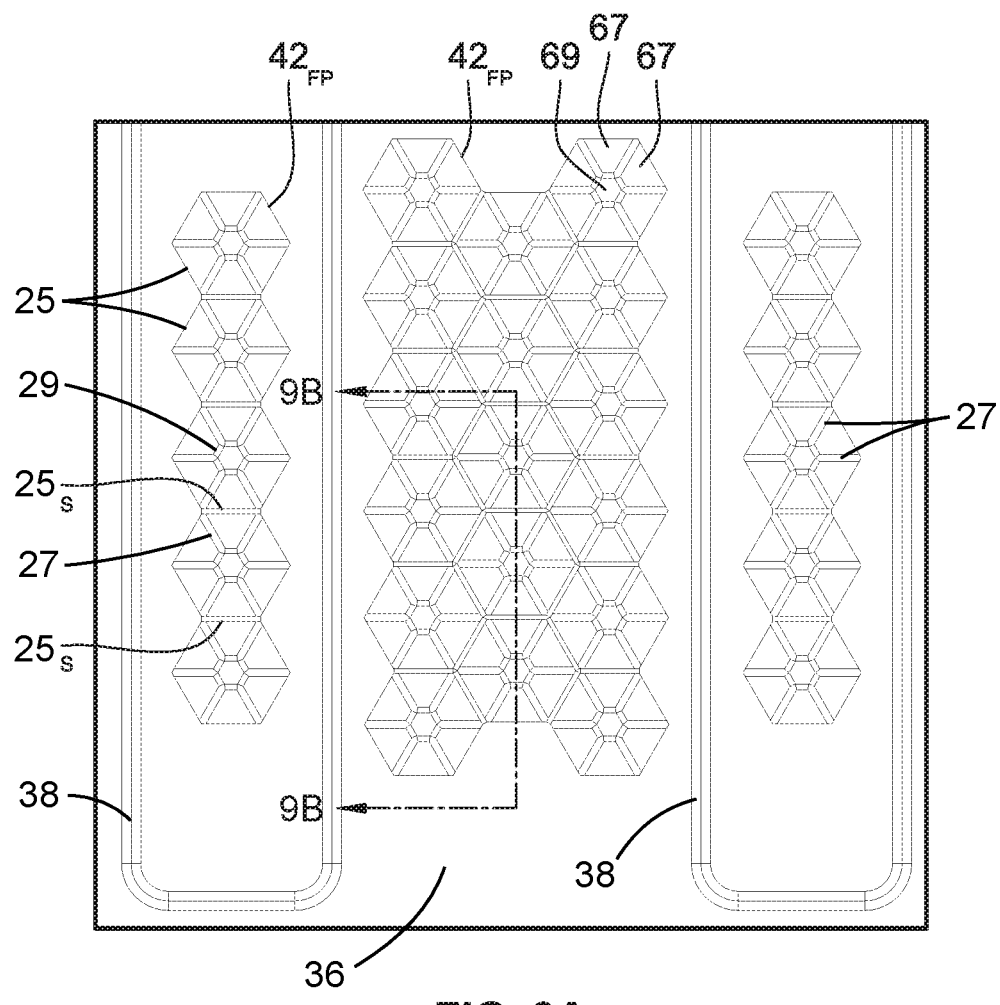
FIGS. 9A-B are bottom and sectional views, respectively, of generally frusto-pyramidal embossments.
Figure 9B:
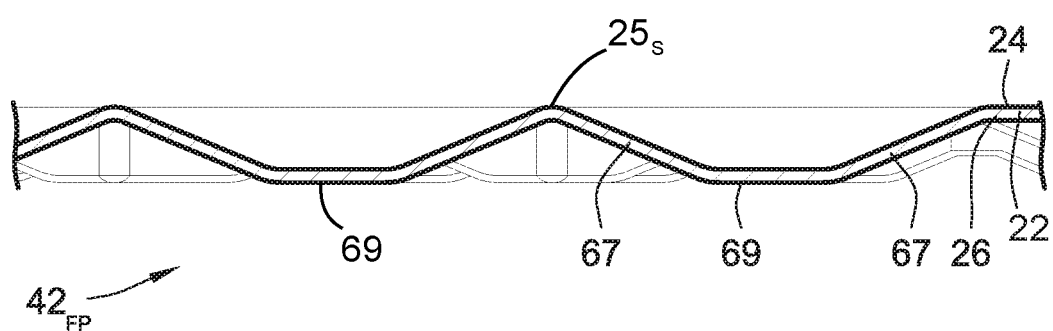

Note that FIG. 8A exhibits two different sizes of generally frusto-hemispherical embossments $42_{FH}$, and FIG. 9A shows two different sizes of generally frusto-pyramidal embossments $42_{FP}$. These figures illustrate that the size of the embossments 42 may vary for any given cover 20. Also note that a cover 20 may also include more than one type or shape of embossments 42. For example, a cover 20 may include generally hemispherical embossments $42_H$, generally frusto-hemispherical embossments $42_{FH}$ and generally frusto-pyramidal embossments $42_{FP}$ thereon. This variation among sizes and types/shapes of embossments 42 (as well as variation among spacings, arrangements, etc.) may occur across the bottom surface 26 of a cover 26, as well as within one or more of the unsupported areas 36 of the cover 20.

As mentioned above, selected combinations of metal alloy, sheet thickness 31 and embossment shape, size and arrangement are effective for dissipating in-plane a substantial portion of the mechanical impulse's kinetic energy so as to minimize the orthogonal deflection 41 of the sheet 22. In one such effective combination, the metal used for the sheet 22 may be a ferrous alloy having a yield strength of at least 900 MPa, with the aforementioned "substantial portion" of the mechanical impulse's kinetic energy being at least 9% thereof (e.g., at least 9% of the mechanical impulse's 85 J). In another effective combination, the metal used for the sheet 22 may be an aluminum alloy having a yield strength of at least 300 MPa, with the aforementioned substantial portion being at least 12% of the mechanical impulse's kinetic energy. These minimums of 9% and 12% for the specified ferrous and aluminum alloys, respectively, result from observations that (i) the minimum percentage of the mechanical impact's kinetic energy that becomes converted into deformation should be at least 30% (for both ferrous and aluminum alloys), and (ii) of the kinetic energy that is converted into deformation, the minimum percentage of this that is due to in-plane strain should be at least 30% for ferrous alloys and at least 40% for aluminum alloys. Multiplying those two percentages yields a minimum of 30%× 30% (i.e., 9%) for ferrous alloys, and a minimum of 30%× 40% (i.e., 12%) for aluminum alloys. In the absence of specified percentages (e.g., as in the 9% and 12% described above), a "substantial" portion of the mechanical impulse's kinetic energy may be interpreted as at least 9% thereof.

Various combinations of metal alloy, sheet thickness 31 and embossment shape, size and arrangement have demonstrated effectiveness for limiting orthogonal deflection 41 as described herein. In one such configuration, the metal used for the sheet 22 may be a ferrous alloy having a yield strength of at least 900 MPa, the nominal thickness 31 may be 1.0 to 1.5 mm, and each of the plurality of embossments 42 may be generally pyramid-shaped $42_P$ or generally frusto-pyramid-shaped $42_{FP}$. In another configuration, the metal may be a ferrous alloy having a yield strength of at least 250 MPa and a strain hardening index of 0.15 to 0.80, the nominal thickness 31 may be 1.5 to 2.5 mm, and each of the plurality of embossments 42 may be generally hemisphere-shaped $42_H$ or generally frusto-hemisphere-shaped $42_{FH}$. And in yet another configuration, the metal may be an aluminum alloy having a yield strength of at least 200 MPa, the nominal thickness may be 1.5 to 2.5 mm, and each of the plurality of embossments may be generally pyramid-shaped, generally sigma (Σ)-profiled or generally delta (Δ)-shaped.

As illustrated in FIG. 2B, an energy dissipation system 10 according to the present disclosure includes a component 11 sensitive to mechanical impulse 13, and an energy-dissipating cover 20 disposed so as to cover the component 11. In the energy dissipation system 10, the component 11 may be a battery, an engine component, a transmission component or an exhaust component, and the energy-dissipating cover 20 may be as previously described above, with the top surface 24 of the sheet 22 facing the component 11.

Figure 13:
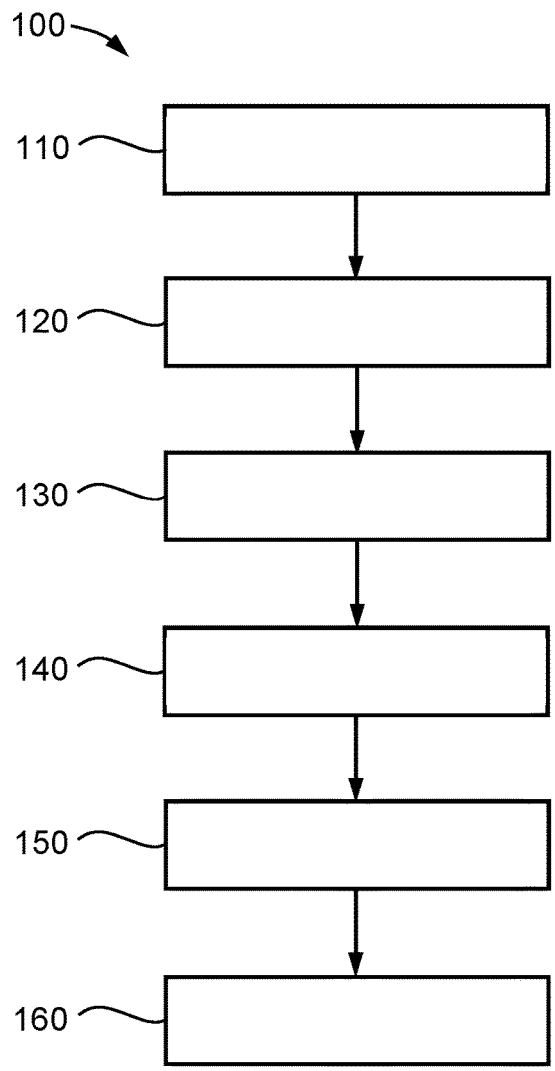
FIG. 13 is a flowchart for a method of forming embossments in a sheet of metal.

FIG. 13 shows a flowchart for a method 100 of forming embossments 42 in a sheet 22 of metal according to the present disclosure, and FIGS. 15A-D show an apparatus 80 and sequence of steps for performing the method 100. At block 110, the method 100 starts. At block 120, the sheet 22 is placed on a first surface 82 of a female die 84, with the first surface 82 having a plurality of embossment cavities 86 arranged thereon. At block 130, the sheet 22 is inductively heated at one or more loci 88 on the sheet 22 which correspond to respective locations 89 of a selection or subset 90 of the plurality of embossment cavities 86. At block 140, a male die 91 is positioned over the sheet 22 and the female die 84, wherein the male die 91 has one or more embossment protrusions 92 which correspond in size, shape and arrangement to the selection 90 of embossment cavities 86, such that the one or more embossment protrusions 92 are disposed in registration with the selection 90 of the plurality of embossment cavities 86. At block 150, the sheet 22 is pressed at the one or more loci 88 with the one or more embossment protrusions 92 so as to form the embossments 42 in the sheet 22. And at block 160, the method 100 ends or terminates.

In this method 100, the metal may be a ferrous alloy having a yield strength of at least 900 MPa, a ferrous alloy having a strain hardening index of at least 0.15, or an aluminum alloy having a yield strength of at least 200 MPa. Also in this method 100, the embossment cavities 86 and protrusions 92 may be configured to produce embossments 42 in the sheet 22 that are generally hemispherical $42_H$, generally pyramidal $42_P$, generally delta (Δ)-shaped $42_Δ$, generally frusto-hemispherical $42_{FH}$, generally frusto-pyramidal $42_{FP}$ or generally sigma (Σ)-profiled $42_Σ$. In the method 100, the selection 90 of embossment cavities 86 may be less than an entirety 93 of the plurality of embossment cavities 86, or it may be the entirety 93 of the embossment cavities 86.

FIGS. 15A-D illustrate successive steps for using an apparatus 80 to carry out the method 100. Using the apparatus 80, the step of inductively heating the sheet 22 at one or more loci 88 (block 130) may be performed by placing a coil 94 proximate the one or more loci 88 and passing electric current 95 through the coil 94. The apparatus 80 for forming embossments 42 in a sheet 22 of metal (e.g., a ferrous alloy having a yield strength of at least 900 MPa, a ferrous alloy having a strain hardening index of at least 0.15, or an aluminum alloy having a yield strength of at least 200 MPa), includes: (i) a female die 84 having a first surface 82 and a plurality of embossment cavities 86 formed on the first surface 82; and (ii) a male die 91 having one or more embossment protrusions 92 corresponding in size, shape and arrangement to a selection 90 of the plurality of embossment cavities 86. The male die 91 is configured for movement between a first position 96, in which the one or more embossment protrusions 92 are disposed away from the first surface 82, and a second position 97, in which the one or more embossment protrusions 92 are disposed proximate and in registration with the selection 90 of embossment cavities 86. The apparatus 80 further includes: (iii) a coil 94 configured for movement between a third position 98, in which the coil 94 is disposed away from the first surface 82, and a fourth position 99, in which the coil 94 is disposed proximate and in registration with the selection 90 of embossment cavities 86. The coil 94 is energizeable with an electric current 95 when in the fourth position 99 so as to inductively heat the sheet 22 when the sheet 22 is interposed between the coil 94 and the female die 84.

Figure 15A:
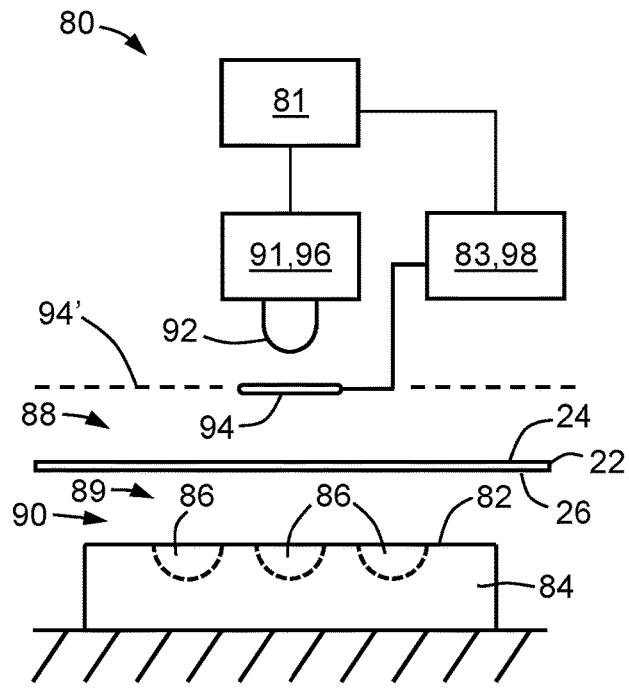
FIGS. 15A-D illustrate successive steps for use of an apparatus for forming embossments in a sheet of metal.
Figure 15B:
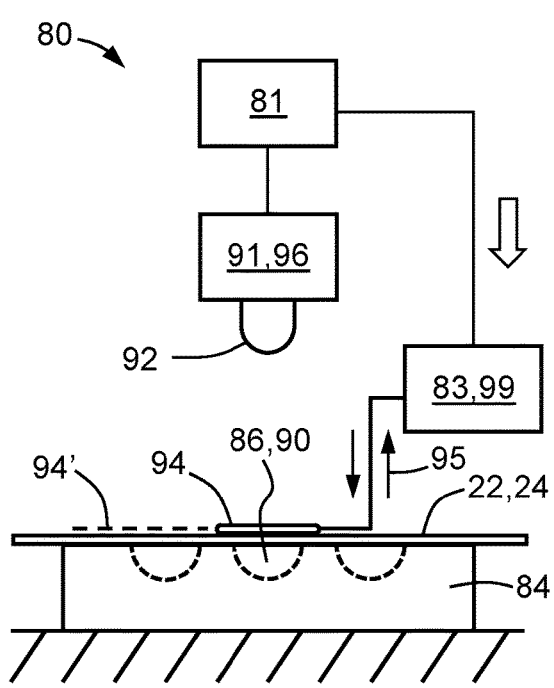
Figure 15C:
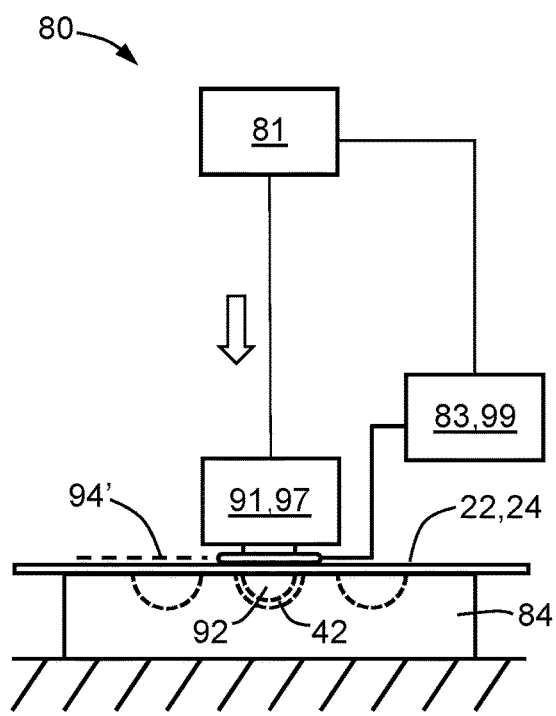
Figure 15D:
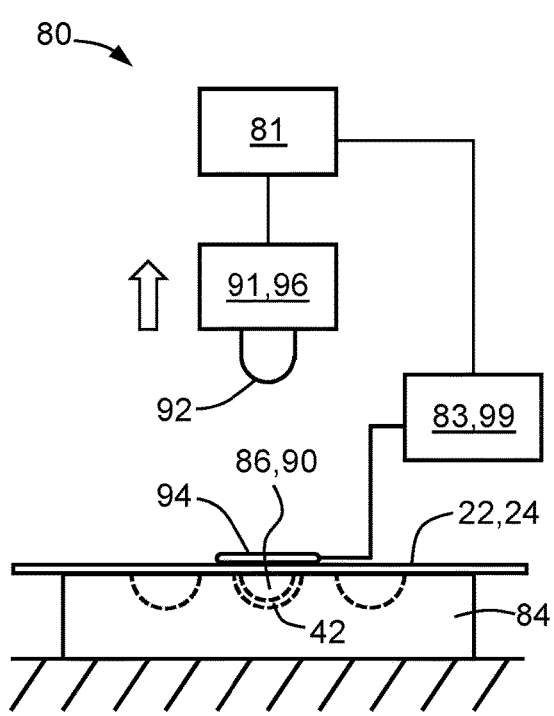

FIG. 15A shows the sheet 22 disposed over the first surface 82 of the female die 84, with the male die 91 disposed in the first position 96 and the coil 94 disposed in the third position 98 (i.e., both the male die 91 and the coil 94 are disposed away from the first surface 82). Next, FIG. 15B shows the coil 94 being moved to the fourth position 99 in which the coil 94 is disposed proximate the top surface 24 of the sheet 22 (and proximate the first surface 82 of the female die 84), and in registration or alignment with a selection or subset 90 of the embossment cavities 86. Next, FIG. 15C shows the male die 91 being moved to the second position 97 in which the embossment protrusions 92 extend through the coil plane 94' and form the embossments 42 in the sheet 22. Finally, FIG. 15D shows the male die 91 being retracted away from the sheet 22, such as in the first position 96. With the selection 90 of one or more embossments 42 being thusly formed, the coil 94 may be moved or indexed to the next loci 88 corresponding to the next selection or subset 90 of embossments 42 to be formed.

Figure 16A:
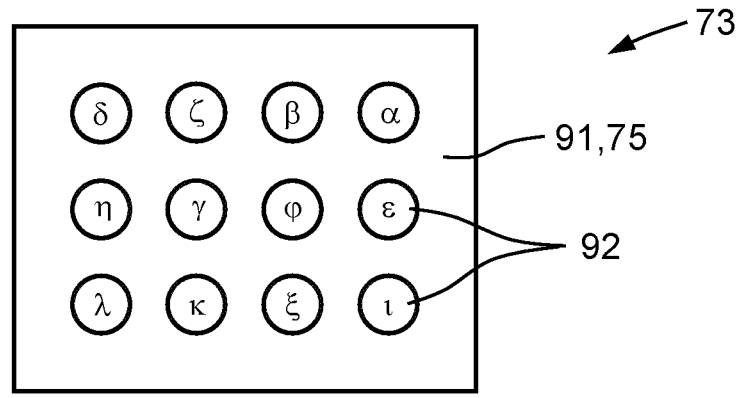
FIG. 16A shows a schematic underside view of a male die for forming embossments in the sheet of FIG. 18B.
Figure 16B:
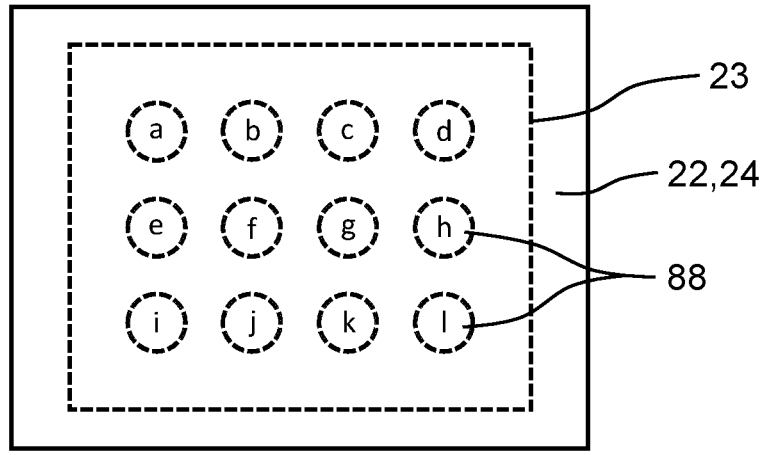
FIG. 16B shows a schematic top view of a sheet in which embossments are to be formed at selected loci.
Figure 16C:
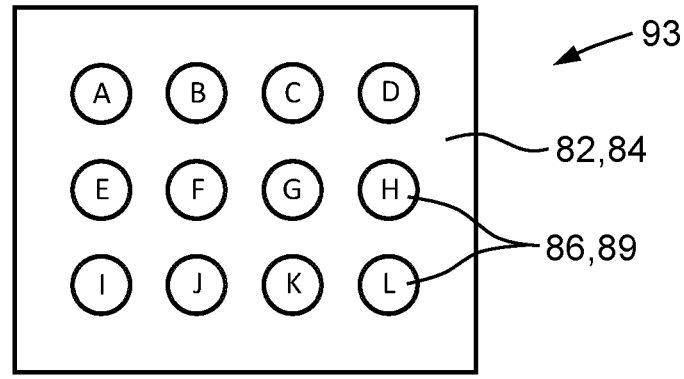
FIG. 16C shows a schematic top view of a female die for forming embossments in the sheet of FIG. 18B.

FIG. 16A shows a schematic underside or bottom view of a male die 91 for forming embossments 42 at selected loci 88 in the sheet 22 of FIG. 16B, and FIG. 16C shows a schematic top view of a corresponding female die 84 for forming embossments 42 in the sheet 22 of FIG. 16B. The male die 91 has one or more embossment protrusions 92 situated at and extending from respective points 73 on the face 75 of the male die 91, with the exemplary male die 91 shown in FIG. 16A having a total of twelve embossment protrusions 92. These embossment protrusions 92 are labeled using twelve selected lower-case letters of the Greek alphabet: alpha (α), beta (β), zeta (ζ), delta (δ), epsilon (ε), phi (φ), gamma (γ), eta (η), iota (ι), xi (ξ), kappa (κ) and lambda (λ). The female die 84 has one or more embossment cavities 86, with the exemplary female die 84 shown in FIG. 16C having a total of twelve embossment cavities 86. Each of these embossment cavities 86 has a respective location 89 on the female die 84, with the locations 89 being labeled using the first twelve capital letters of the English alphabet: A, B, C, D, E, F, G, H, I, J, K and L. The sheet 22 has one or more loci 88 defined on the top surface 24 of the sheet 22, with the exemplary sheet 22 shown in FIG. 16B having a total of twelve loci 88. These loci 88 are labeled using the first twelve lower-case letters of the English alphabet: a, b, c, d, e, f, g, h, i, j, k and l. The points 75 of the embossment protrusions 92, the loci 88 of the embossments 42 on the sheet 22, and the locations 89 of the embossment cavities 86 may correspond and be mutually aligned with one another as illustrated in FIGS. 16A-C and in TABLE 1 below.

TABLE 1

| Alignments among Points, Loci and Locations (FIGS. 16A-C) | | | | | | | | | | | | |
|---|---|---|---|---|---|---|---|---|---|---|---|---|
| Point 75 of embossment protrusion 92 on male die 91 | α | β | ζ | δ | ε | φ | γ | η | ι | ξ | κ | λ |
| Locus 88 of embossment 42 on sheet 22 | a | b | c | d | e | f | g | h | i | j | k | L |
| Location 89 of embossment cavity 86 on female die 84 | A | B | C | D | E | F | G | H | I | J | K | L |

Figure 19A:
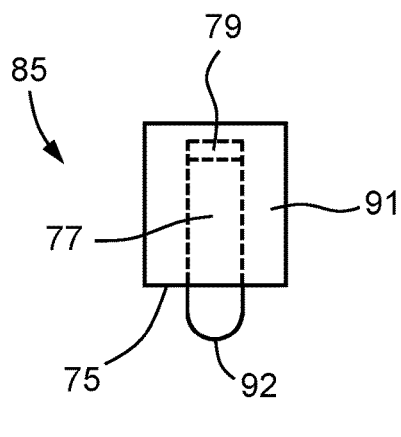
FIGS. 19A-B show schematic side views of a male die in retracted and extended positions, respectively.
Figure 19B:
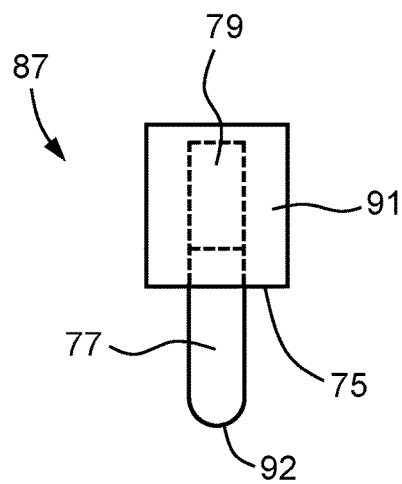

In FIGS. 16A-C, an arrangement is shown having twelve embossment protrusions 92 on the male die 91 and twelve embossment cavities 86 on the female die 84, which is capable of producing twelve embossments 42 within the selected portion 23 of the sheet 22 for a single engagement between the male and female dies 91, 84. (Here, an "engagement" means a coming together of the two dies 91, 84 to produce embossments 42 in the interposed sheet 22, such as illustrated in FIGS. 15A-D.) However, some sheets 22 may have multiple selected portions 23, requiring multiple engagements between the dies 91, 84. Also, some selected portions 23 may require less than twelve embossments 42 therein. For this reason, as illustrated in FIGS. 19A-B, each of the one or more embossment protrusions 92 may be affixed to a respective elongate member 77, wherein each elongate member 77 is slidably moveable within a respective passage 79 formed in the male die 91 between a retracted position 85 and an extended position 87. Each elongate member 77 may be independently actuatable, such that some subset or selection of the entire collection of elongate members 77 may be actuated while other elongate members 77 are not actuated. This actuation may be effected by pneumatic pressure, hydraulic pressure, electrical solenoids or the like. While FIGS. 19A-B show the male die 91 having only a single elongate member 77 and embossment protrusion 92, this is for illustration purposes only, and the male die 91 may be configured with any number and arrangement of elongate members 77 and embossment protrusions 92.

Figure 17:
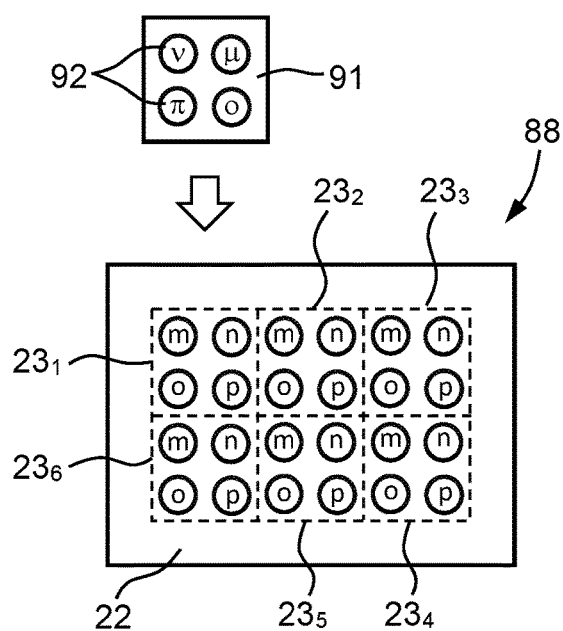
FIG. 17 shows a schematic underside view of a male die for forming embossments and a schematic top view of a sheet in which embossments are to be formed.
Figure 18:
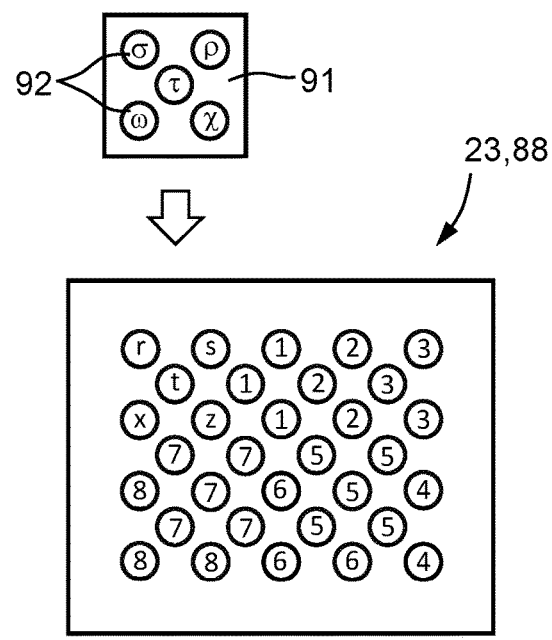
FIG. 18 shows a schematic underside view of an alternative male die for forming embossments and a schematic top view of a sheet in which embossments are to be formed.

FIGS. 17 and 18 show two examples illustrating how a male die 91 and corresponding female die 84 (not shown) may undergo multiple successive engagements to produce multiple successive sets of embossments 42 in a sheet 22, and may even produce sets that differ from one another in terms of the arrangement of embossments 42 produced in each engagement of the dies 91, 84. FIG. 17 shows a male die 91 having four embossment protrusions 92 arrayed in a "rectangular" arrangement, labeled with the lower-case Greek letters mu (μ), nu (ν), omicron (o) and pi (π), as well as a sheet 22 having six selected portions 23 all having the same "rectangular" arrangement of four loci 88 each, labeled with the lower-case English letters m, n, o and p. The male and female dies 91, 84 may engage a first time to produce a first set of embossments 42 within a first selected portion 23$_1$ of the sheet 22. Then the sheet 22 and/or the dies 91, 84 may be moved or indexed such that the dies 91, 84 are respectively positioned above and below the second selected portion 23$_2$ of the sheet 22, whereupon the dies 91, 84 may be engaged a second time to produce a second set of embossments 42 within the second selected portion 23$_2$. This process may be repeated to produce embossments 42 in the third through sixth selected portions 23$_3$, 23$_4$, 23$_5$, 23$_6$.

FIG. 18 shows a male die 91 having five embossments 92 arrayed in an "interlaced" arrangement, labeled with the lower-case Greek letters rho (ρ), sigma (σ), tau (τ), chi (χ) and omega (ω), as well as a sheet 22 having multiple selected portions 23 involving a variety of different arrangements of loci 88. In this configuration, each of the five embossment protrusions 92 may be actuated independently, such that successive engagements of the dies 91, 84 may utilize successively different actuations of the embossment protrusions 92. For example, a first engagement of the dies 91, 84 may actuate all five of the embossment protrusions 92, producing an initial set of five embossments 42 at the loci 88 labeled with the lower-case English letters r, s, t, x and z. The sheet and/or dies 91, 84 may then be moved or indexed in preparation to produce a next set of three embossments 42 labeled with the numeral "1", whereupon only embossment protrusions 92 rho (ρ), tau (τ) and chi (χ) are actuated. The sheet and/or dies 91, 84 may then be moved or indexed again, and again only embossment protrusions 92 rho (ρ), tau (τ) and chi (χ) actuated, to produce a next set of three embossments 42 labeled with the numeral "2", and the process repeated again to produce a next set of three embossments 42 labeled with the numeral "3". The sheet and/or dies 91, 84 may then be moved or indexed in preparation to produce a next set of two embossments 42 at the loci 88 labeled with the numeral "4", whereupon only embossment protrusions 92 rho (ρ) and chi (χ) are actuated. (Alternatively, embossment protrusions 92 sigma (σ) and omega (ω) may be actuated. In either case, the male die 91 is disposed such that appropriate set of two embossment protrusions 92 is positioned over the loci 88 labeled with the numeral "4".) This process continues with the sets of embossments 42 labeled with the numerals "5" through "8". Note that the foregoing sequence of producing embossments 42 is only one of many possible sequences that may be used.

As shown in FIG. 15, the apparatus 80 may further include a controller 81 for controlling movement of the male die 91 (and/or selected ones of the elongate members 77) between the first and second positions 96, 97 (and/or between the retracted and extended positions 85, 87). The male die 91 may be moved between these positions 96, 97 (and/or among other positions in 3D space) by robotic articulation or other forms of automated or controlled movement. The second position 97 may be a position such as illustrated in FIG. 15C where the male die 91 and/or embossment protrusions 92 press through the coil plane 94' so as to form the embossments in the sheet 22, or it may be a position where the male die 91 hovers with its embossment protrusions 92 in contact with the top surface 24 of the sheet 22 (or slightly spaced away from the top surface 24), whereupon selected ones of the elongate members 77 (see FIG. 19) may be actuated to form corresponding embossments 42 in the sheet 22. The apparatus 80 may further include a controller 83 for energizing the coil 94 with electric current 95 and for controlling movement of the coil 94 between the third and fourth positions 98, 99. The functions of energizing the coil 94, moving the coil 94 and moving the male die 91 may be combined into or divided among one or multiple controllers.

The coil 94 may be configured in a planar arrangement lying within a coil plane 94'. For example, the coil 94 may be a single circle of wire, or multiple concentric circles of wire, with the coil 94 disposed within a flat plane. The coil 94 may include multiple independent loops or coils (not shown), and selected ones of these independent loops or coils may be activated when the coil 94 is disposed proximate the sheet 22 in order to inductively heat corresponding/proximate loci 88 on the sheet 22. When the coil 94 is in the fourth position 99, the coil 94 may be oriented with the coil plane 94' generally parallel to the first surface 82. As illustrated in FIG. 15C, the one or more embossment protrusions 92 may extend through the coil plane 94' when the male die 91 and the coil 94 are disposed in the second and fourth positions 97, 99, respectively. The coil 94 may be energized to produce localized and rapid heating (e.g., in less than 0.5 seconds) of the sheet 22 at one or more selected loci 88 thereon.

Figure 14:
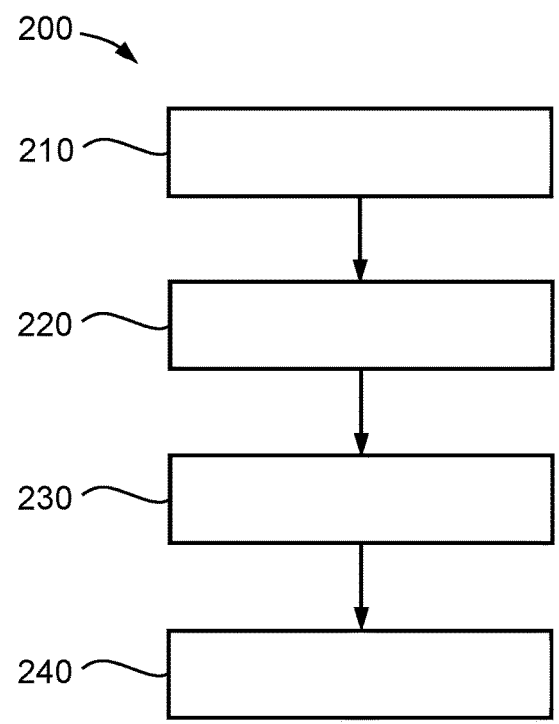
FIG. 14 is a flowchart for an alternate method of forming embossments in a sheet of metal.

FIGS. 14 and 20 illustrate an alternative method 200 and apparatus 300, respectively, for forming embossments 42 in a sheet 22 of metal (e.g., a ferrous alloy having a yield strength of at least 900 MPa, a ferrous alloy having a strain hardening index of at least 0.15, or an aluminum alloy having a yield strength of at least 200 MPa) according to the present disclosure. The method 200 includes the following steps. At block 210, the method 200 starts; for example, the apparatus 300 used for executing the method 200 may be presented as shown in FIG. 20A. At block 220, the sheet 22 is placed on a first surface 82 of a die 84 (such as the female die 84 shown in FIG. 20B). The first surface 82 of the die 84 has a plurality of embossment cavities 86 arranged thereon, and the sheet 22 has a bottom surface 26 in contact with the first surface 82 and a top surface 24 having an ablative or vaporizable coating 304 formed thereon. FIG. 20A shows three cavities 86 labeled with subscripts; namely, $86_1$, $86_2$ and $86_3$. These three cavities $86_1$, $86_2$, $86_3$ collectively may be viewed as an entirety 93 of the cavities 86, with any one cavity 86 or subset of the entirety 93 of cavities 86 being viewed as a selection 90 of the entirety 93 of cavities 86. (For example, $86_1$ would be a selection 90 of the entirety 93.) Each of the individual cavities $86_1$, $86_2$, $86_3$ has a respective location $89_1$, $89_2$, $89_3$ on the first surface 82 of the die 84, and the sheet 22 has a respective locus $88_1$, $88_2$, $88_3$ thereon corresponding to where embossments 42 will be formed thereon.

Figure 20A:
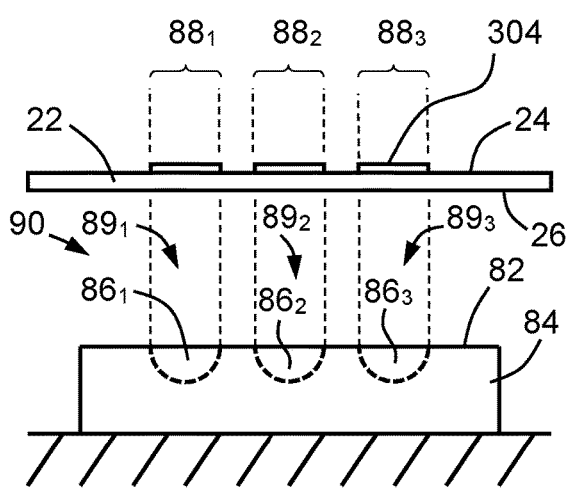
FIGS. 20A-D illustrate successive steps for use of an alternative apparatus for forming embossments in a sheet of metal.
Figure 20B:
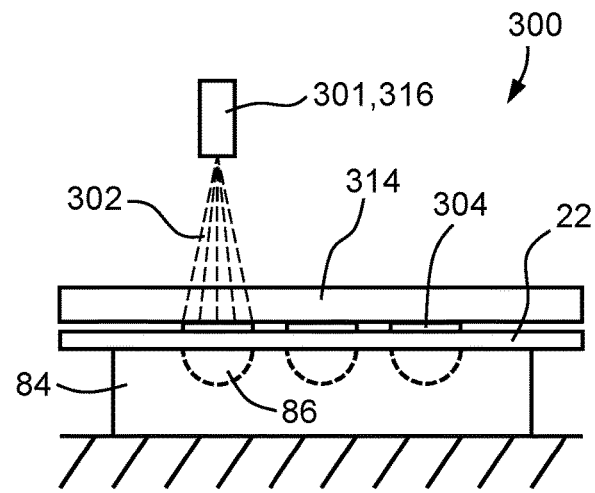
Figure 20C:
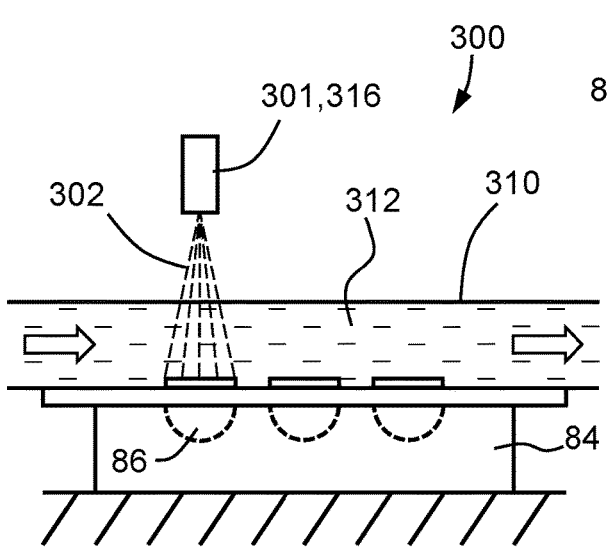
Figure 20D:
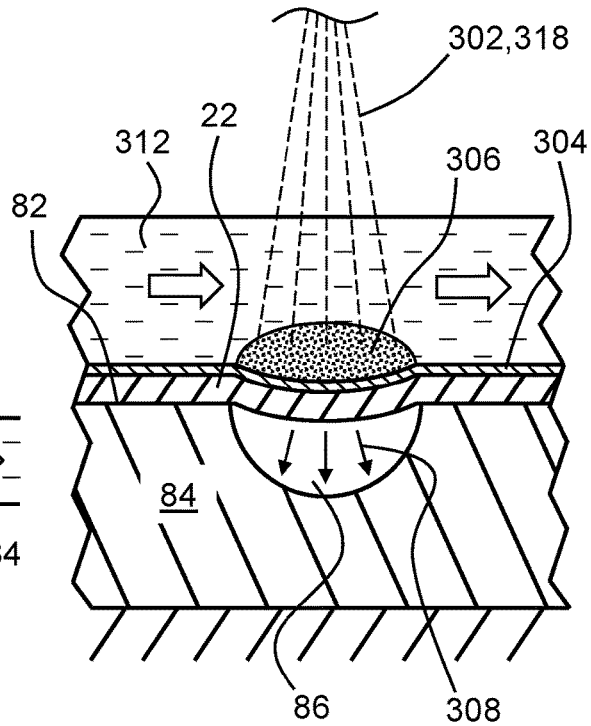

The ablative coating 304 may be made of a material capable of absorbing energy from a laser beam 302 at a given wavelength; for example, the material may be a black paint. At block 230 (and as illustrated in FIGS. 20B-C), a laser beam 302 is directed at the ablative coating 304 at one or more loci 88 on the top surface 24 of the sheet 22 which correspond to respective locations 89 of a selection 90 of the plurality of embossment cavities 86 on the first surface 82 of the die 84. This is done to locally ablate or vaporize the ablative coating 304 at the one or more loci 88 (as illustrated in FIG. 20D), thereby turning the ablative coating 304 at the one or more loci 88 into plasma 306 and causing a plasma pressure shock wave 308 at each of the one or more loci 88 and pressing the sheet 22 into the selection 90 of embossment cavities 86. And at block 240, the method 200 ends or terminates.

The laser beam 302 may be directed at the ablative coating 304 through an infrared-transparent plate 314 (as illustrated in FIG. 20B), or through a stream of coolant 312 (as illustrated in FIG. 20C), or through both. The coolant 312 may be water, and the infrared-transparent plate 314 may be made of sapphire or other infrared-transparent material. The stream of coolant 312 or the infrared-transparent plate 314 may disposed in covering contact with the ablative coating 304 (e.g., covering the ablative coating 304 and in contact with the ablative coating 304). Note that while FIGS. 20B-D show the laser beam 302 being directed at only one locus 88 of ablative coating 304, this is for illustration purposes only, as the laser beam 302 may alternatively be directed at multiple loci 88 at once. Also, while FIGS. 20A-C show multiple individual discrete loci 88 of ablative coating 304, note that FIG. 20D illustrates the alternative of the ablative coating 304 being applied across a large area of the top surface 24 of the sheet 22.

The laser beam 302 may have a wavelength of 800 to 1500 nanometers. For many ablative coatings 304 (e.g., black paint), this range of wavelength is effective for rapidly ablating or vaporizing the coating material. For example, the laser beam 302 may be produced by a laser 301 having a maximum nominal power output of 1.5 kW, and the laser beam 302 may be directed at the ablative coating 304 for less than 0.5 seconds.

FIGS. 20A-D (and in particular, FIGS. 20B-C) illustrate an exemplary apparatus 300 for performing the alternative method 200 described above (i.e., forming embossments 42 in a sheet 22 of metal, the sheet 22 having a top surface 24 with an ablative coating 304 thereon and a bottom surface 26 opposite the top surface 24). The apparatus 300 includes: (i) a die 84 having a first surface 82 and a plurality of embossment cavities 86 formed on the first surface 82, wherein the first surface 82 is configured to support the bottom surface 26 of the sheet 22; (ii) a laser 301 disposed above the first surface 82 and configured for directing a laser beam 302 at one or more locations 89 of a selection 90 of the plurality of embossment cavities 42; and (iii) at least one of a stream of coolant 312 and an infrared-transparent plate 314 configured to be disposed in covering contact with the ablative coating 304 when the bottom surface 26 of the sheet 22 is supported on the first surface 82. The apparatus 300 may further include abeam splitter 316 for splitting a single laser beam from the laser 301 into two or more divided laser beams 318 (one of which is illustrated in FIG. 20D). The stream of coolant 312 and/or the infrared-transparent plate 314 may be disposed between the laser 301 and the first surface 82 of the die 84, and the one or more laser beams 302, 318 may be directed through the stream of coolant 312 and/or through the infrared-transparent plate 314. The apparatus 300 may further include a container 310 for containing the stream of coolant 312. This container 310 may be enclosed and optionally pressurized, or it may be open to the atmosphere.

Note that the methods 100, 200 and apparatuses 80, 300 described above may be particularly well suited for forming embossments 42 in the metal sheet 22 described above, and for producing energy-dissipating covers 20 and energy dissipation systems 10 as described herein. The metal used for the sheet 22 in these methods 100, 200 and apparatuses 80, 300 may be a ferrous alloy having a yield strength of at least 900 MPa, a ferrous alloy having a strain hardening index of at least 0.15, or an aluminum alloy having a yield strength of at least 200 MPa), with the nominal sheet thickness being no more than 2.5 mm. The shape, size and arrangement of the embossments 42 formed in the sheet 22 from each of these methods 100, 200 and apparatuses 80, 300 may be such that the orthogonal deflection 41 of the sheet 22 from a mechanical impulse 13 of 85 J (directed at the bottom surface 26 of the sheet 22 in a normal direction and at the embossments 42) is limited to no more than 12 mm. The sheet 22 of metal may be fed into and/or indexed within the foregoing apparatuses 80, 300 by rolling or roll feeding. Also, the methods 100, 200 and apparatuses 80, 300 for forming embossments 42 may include steps and/or apparatuses used for hot stamping (also known as press hardening or hot press forming); alternatively, the methods 100, 200 and apparatuses 80, 300 may be incorporated into processes and apparatuses used for hot stamping. In any case, the embossments 42 may be formed one at a time, in groups of two or more at a time, or all at once across the entire sheet 22. Further, note that while the sheet 22 may have a starting nominal thickness 31, embossments 42 formed by the apparatus 80, 300 and methods 100, 200 may have a different thickness due to the forces and pressures involved in the manufacturing process. Also note that the male die 91 and/or its embossment protrusions 92 in the inductive heating method 100 may be water-cooled, or, alternatively, its temperature kept uniformly below room temperature.

The above description is intended to be illustrative, and not restrictive. While various specific embodiments have been presented, those skilled in the art will recognize that the disclosure can be practiced with various modifications within the spirit and scope of the claims. While the dimensions and types of materials described herein are intended to be illustrative, they are by no means limiting and are exemplary embodiments unless otherwise indicated. In the following claims, use of the terms "first", "second", "top", "bottom", etc. are used merely as labels, and are not intended to impose numerical or positional requirements on their objects. As used herein, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "adjacent to", "close to", "close by", "at" or the like.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. An energy-dissipating cover for covering a component sensitive to mechanical impulse, comprising:
   a sheet of metal selected from a ferrous alloy having a yield strength of at least 900 MPa, a ferrous alloy having a strain hardening index of at least 0.15 and an aluminum alloy having a yield strength of at least 200 MPa, the sheet defining in-plane and orthogonal out-of-plane directions and having a top surface, a bottom surface, an outer perimeter, an overall area within the outer perimeter and a nominal thickness of no more than 2.5 mm, wherein the sheet is configured for connection with one or more external structures at a plurality of connection points within the outer perimeter, wherein the overall area comprises a plurality of supported areas and at least one unsupported area that does not overlap any of the supported areas, wherein each of the supported areas runs along the outer perimeter, surrounds at least one of the plurality of connection points, surrounds one or more folds formed in the sheet, and/or surrounds one or more reinforcements attached to the sheet; and
   a plurality of embossments formed within the at least one unsupported area and extending outward from the bottom surface, wherein the embossments are shaped, sized and arranged so as to be effective for limiting to no more than 12 mm an orthogonal deflection of the sheet from a mechanical impulse, wherein the mechanical impulse is directed normal to the bottom surface of the sheet at the plurality of embossments and has a kinetic energy of 85 J and a duration of no more than 10 ms.

2. An energy-dissipating cover according to claim 1, wherein each of the embossments is one of a generally hemispherical embossment, a generally pyramidal embossment, a generally delta (Δ)-shaped embossment, a generally frusto-hemispherical embossment, a generally frusto-pyramidal embossment and a generally sigma (Σ)-profiled embossment.

3. An energy-dissipating cover according to claim 1, wherein the shape, size and arrangement of the embossments is effective for dissipating in-plane a substantial portion of the kinetic energy of the mechanical impulse.

4. An energy-dissipating cover according to claim 3, wherein the metal is one of a ferrous alloy having a yield strength of at least 900 MPa with the substantial portion being at least 9%, and an aluminum alloy having a yield strength of at least 300 MPa with the substantial portion being at least 12%.

5. An energy-dissipating cover according to claim 2, wherein each generally pyramidal embossment comprises three, four, five or six generally triangular side portions and each generally frusto-pyramidal embossment comprises three, four, five or six generally isosceles trapezoid-shaped side portions, and wherein a base edge of each generally pyramidal or generally frusto-pyramidal embossment is substantially contiguous with a second base edge of an adjacent generally pyramidal or generally frusto-pyramidal embossment.

6. An energy-dissipating cover according to claim 2, wherein a leg of each generally delta (Δ)-shaped embossment is substantially contiguous with a second leg of an adjacent generally delta (Δ)-shaped embossment.

7. An energy-dissipating cover according to claim 6, further comprising a respective generally hemispherical embossment or generally frusto-hemispherical embossment disposed at each vertex of each generally delta (Δ)-shaped embossment.

8. An energy-dissipating cover according to claim 2, wherein each of the plurality of embossments is generally hemisphere-shaped, generally frusto-hemisphere-shaped or generally sigma (Σ)-profiled, and the embossments are spaced apart from each other.

9. An energy-dissipating cover according to claim 1, wherein the energy-dissipating cover is one of a skid plate, a battery tray bottom sheet and a battery compartment side wall, and the component sensitive to mechanical impulse is one of a battery, an engine component, a transmission component and an exhaust component.

10. An energy-dissipating cover according to claim 1, wherein:
the metal is a ferrous alloy having a yield strength of at least 900 MPa, the nominal thickness is 1.0 to 1.5 mm, and each of the plurality of embossments is generally pyramid-shaped or generally frusto-pyramid-shaped;
the metal is a ferrous alloy having a yield strength of at least 250 MPa and a strain hardening index of 0.15 to 0.80, the nominal thickness is 1.5 to 2.5 mm, and each of the plurality of embossments is generally hemisphere-shaped or generally frusto-hemisphere-shaped; or
the metal is an aluminum alloy having a yield strength of at least 200 MPa, the nominal thickness is 1.5 to 2.5 mm, and each of the plurality of embossments is generally pyramid-shaped, generally sigma (Σ)-profiled or generally delta (Δ)-shaped.

11. An energy dissipation system, comprising:
a component sensitive to mechanical impulse, the component comprising one of a battery, an engine component, a transmission component and an exhaust component; and
an energy-dissipating cover disposed so as to cover the component, the energy-dissipating cover comprising:
a sheet of metal selected from a ferrous alloy having a yield strength of at least 900 MPa, a ferrous alloy having a strain hardening index of at least 0.15 and an aluminum alloy having a yield strength of at least 200 MPa, the sheet defining in-plane and orthogonal out-of-plane directions and having a top surface facing the component, a bottom surface, an outer perimeter, an overall area within the outer perimeter and a nominal thickness of no more than 2.5 mm, wherein the sheet is configured for connection with one or more external structures at a plurality of connection points within the outer perimeter, wherein the overall area comprises a plurality of supported areas and at least one unsupported area that does not overlap any of the supported areas, wherein each of the supported areas runs along the outer perimeter, surrounds at least one of the plurality of connection points, surrounds one or more folds formed in the sheet, and/or surrounds one or more reinforcements attached to the sheet; and
a plurality of embossments formed within the at least one unsupported area and extending outward from the bottom surface, wherein the embossments are shaped, sized and arranged so as to be effective for dissipating in-plane a substantial portion of a kinetic energy of a mechanical impulse of 85 J having a duration of no more than 10 ms directed normal to the bottom surface of the sheet at the plurality of embossments and for limiting orthogonal deflection of the sheet from the mechanical impulse to no more than 12 mm;
wherein each of the plurality of embossments is generally hemisphere-shaped, generally pyramid-shaped, generally delta (Δ)-shaped, generally frusto-hemisphere-shaped, generally frusto-pyramid-shaped or generally sigma (Σ)-profiled.

12. An energy dissipation system according to claim 11, wherein the metal is one of a ferrous alloy having a yield strength of at least 900 MPa with the substantial portion being at least 9%, and an aluminum alloy having a yield strength of at least 300 MPa with the substantial portion being at least 12%.

13. An energy dissipation system according to claim 11, wherein:
each generally hemisphere-shaped, generally frusto-hemisphere-shaped or generally sigma (Σ)-profiled embossment is spaced apart from each other embossment; and
each generally pyramid-shaped embossment comprises three, four, five or six triangular side portions and each generally frusto-pyramid-shaped embossment comprises three, four, five or six isosceles trapezoid-shaped side portions, wherein a base edge of each generally pyramid-shaped, generally frusto-pyramid-shaped or generally delta (Δ)-shaped embossment is substantially contiguous with a second base edge of an adjacent generally pyramid-shaped, generally frusto-pyramid-shaped or generally delta (Δ)-shaped embossment.

14. An energy dissipation system according to claim 11, further comprising a respective generally hemispherical embossment or generally frusto-hemispherical embossment disposed at each vertex of each generally delta (Δ)-shaped embossment.

15. An energy dissipation system according to claim 11, wherein:
the metal is a ferrous alloy having a yield strength of at least 900 MPa, the nominal thickness is 1.0 to 1.5 mm, and each of the plurality of embossments is generally pyramid-shaped or generally frusto-pyramid-shaped;
the metal is a ferrous alloy having a yield strength of at least 250 MPa and a strain hardening index of 0.15 to 0.80, the nominal thickness is 1.5 to 2.5 mm, and each of the plurality of embossments is generally hemisphere-shaped or generally frusto-hemisphere-shaped; or
the metal is an aluminum alloy having a yield strength of at least 200 MPa, the nominal thickness is 1.5 to 2.5 mm, and each of the plurality of embossments is generally pyramid-shaped, generally sigma (Σ)-profiled or generally delta (Δ)-shaped.

16. A method of forming a plurality of embossments in a sheet of metal selected from a ferrous alloy having a yield strength of at least 900 MPa, a ferrous alloy having a strain hardening index of at least 0.15 and an aluminum alloy having a yield strength of at least 200 MPa, the sheet defining in-plane and orthogonal out-of-plane directions and having a top surface, a bottom surface, an outer perimeter, an overall area within the outer perimeter and a nominal thickness of no more than 2.5 mm, wherein the sheet is configured for connection with one or more external structures at a plurality of connection points within the outer perimeter, wherein the overall area comprises a plurality of supported areas and at least one unsupported area that does not overlap any of the supported areas, wherein each of the supported areas runs along the outer perimeter, surrounds at least one of the plurality of connection points, surrounds one or more folds formed in the sheet, and/or surrounds one or more reinforcements attached to the sheet, the method comprising:

placing the sheet on a first surface of a female die, the first surface having a plurality of embossment cavities arranged thereon;

inductively heating the sheet at one or more loci on the sheet which correspond to respective locations of a selection of the plurality of embossment cavities;

positioning a male die over the sheet and the female die, wherein the male die has one or more embossment protrusions which correspond in size, shape and arrangement to the selection of embossment cavities, such that the one or more embossment protrusions are disposed in registration with the selection of the plurality of embossment cavities; and pressing the sheet at the one or more loci with the one or more embossment protrusions so as to form the plurality of embossments in the sheet, wherein the embossments are formed within the at least one unsupported area and extend outward from the bottom surface, wherein the embossments are shaped, sized and arranged so as to be effective for limiting to no more than 12 mm an orthogonal deflection of the sheet from a mechanical impulse, wherein the mechanical impulse is directed normal to the bottom surface of the sheet at the plurality of embossments and has a kinetic energy of 85 J and a duration of no more than 10 ms.

17. A method according to claim 16, wherein the metal is one of a ferrous alloy having a yield strength of at least 900 MPa, a ferrous alloy having a strain hardening index of at least 0.15 and an aluminum alloy having a yield strength of at least 200 MPa.

18. A method according to claim 16, wherein the embossment cavities and protrusions are configured to produce embossments in the sheet that are generally hemispherical, generally pyramidal, generally delta (Δ)-shaped, generally frusto-hemispherical, generally frusto-pyramidal or generally sigma (Z)-profiled.

19. A method according to claim 16, wherein the selection of embossment cavities is less than an entirety of the plurality of embossment cavities.

20. A method according to claim 16, wherein the inductively heating step is performed by placing a coil proximate the one or more loci and passing electric current through the coil.

* * * * *